US012737053B2

(12) United States Patent
Colascione et al.

(10) Patent No.: US 12,737,053 B2
(45) **Date of Patent: *Sep. 15, 2026**

(54) VISUAL AND AUDIO WAKE COMMANDS

(71) Applicant: Snap Inc., Santa Monica, CA (US)

(72) Inventors: Daniel Colascione, Melbourne Beach, FL (US); Matthew Hanover, Los Angeles, CA (US); Sergei Korolev, Playa Vista, CA (US); Michael David Marr, Monroe, WA (US); Scott Myers, Orange, CA (US); James Powderly, Venice, CA (US)

(73) Assignee: SNAP INC., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/952,335

(22) Filed: Nov. 19, 2024

(65) Prior Publication Data

US 2025/0085786 A1 Mar. 13, 2025

Related U.S. Application Data

(63) Continuation of application No. 18/367,278, filed on Sep. 12, 2023, now Pat. No. 12,175,022, which is a (Continued)

(51) Int. Cl.

| | |
|---|---|
| ***G06F 3/01*** | (2006.01) |
| ***G06T 19/00*** | (2011.01) |

(Continued)

(52) U.S. Cl.

CPC .............. *G06F 3/017* (2013.01); *G06F 3/014* (2013.01); *G06T 19/006* (2013.01); *G06V 10/82* (2022.01); *G06V 40/28* (2022.01)

(58) Field of Classification Search

CPC ........ G06F 3/017; G06F 3/014; G06F 1/1684; G06F 1/1686; G06F 1/3215;

(Continued)

(56) References Cited

U.S. PATENT DOCUMENTS

| | | | |
|---|---|---|---|
| 7,971,156 | B2 | 6/2011 | Albertson et al. |
| 7,996,793 | B2 | 8/2011 | Latta et al. |

(Continued)

FOREIGN PATENT DOCUMENTS

| | | | |
|---|---|---|---|
| CN | 103049761 | B | 8/2016 |
| EP | 3707693 | A1 | 9/2020 |

(Continued)

OTHER PUBLICATIONS

"U.S. Appl. No. 17/948,004, Corrected Notice of Allowability mailed Sep. 22, 2023", 2 pgs.

(Continued)

*Primary Examiner* — Premal R Patel

(74) *Attorney, Agent, or Firm* — SCHWEGMAN LUNDBERG & WOESSNER, P.A.

(57) ABSTRACT

A gesture-based wake process for an AR system is described herein. The AR system places a hand-tracking input pipeline of the AR system in a suspended mode. A camera component of the hand-tracking input pipeline detects a possible visual wake command being made by a user of the AR system. On the basis of detecting the possible visual wake command, the AR system wakes the hand-tracking input pipeline and places the camera component in a fully operational mode. If the AR system, using the hand-tracking input pipeline, verifies the possible visual wake command as an actual wake command, the AR system initiates execution of an AR application.

20 Claims, 10 Drawing Sheets

Related U.S. Application Data continuation of application No. 17/948,004, filed on Sep. 19, 2022, now Pat. No. 11,797,099.

(51) Int. Cl.
*G06V 10/82* (2022.01)
*G06V 40/20* (2022.01)

(58) Field of Classification Search
CPC ...... G06F 1/3231; G06F 1/3265; G06F 3/012; G06F 3/013; G06F 3/015; G06F 3/016; G06F 3/0304; G06F 3/03547; G06F 3/167; G06F 1/163; G06F 3/16; G06T 19/006; G06V 10/82; G06V 40/28
See application file for complete search history.

(56) References Cited

U.S. PATENT DOCUMENTS 8,487,938 B2 7/2013 Latta et al.
8,856,691 B2 10/2014 Geisner et al.
9,225,897 B1 12/2015 Sehn et al.
9,230,160 B1 1/2016 Kanter
9,276,886 B1 3/2016 Samaranayake
9,705,831 B2 7/2017 Spiegel
9,742,713 B2 8/2017 Spiegel et al.
10,102,423 B2 10/2018 Shaburov et al.
10,284,508 B1 5/2019 Allen et al.
10,439,972 B1 10/2019 Spiegel et al.
10,509,466 B1 12/2019 Miller et al.
10,514,876 B2 12/2019 Sehn
10,579,869 B1 3/2020 Xiong et al.
10,614,855 B2 4/2020 Huang
10,748,347 B1 8/2020 Li et al.
10,958,608 B1 3/2021 Allen et al.
10,962,809 B1 3/2021 Castañeda
10,996,846 B2 5/2021 Robertson et al.
10,997,787 B2 5/2021 Ge et al.
11,012,390 B1 5/2021 Al Majid et al.
11,030,454 B1 6/2021 Xiong et al.
11,036,368 B1 6/2021 Al Majid et al.
11,062,498 B1 7/2021 Voss et al.
11,086,406 B1 8/2021 Ravasz et al.
11,087,728 B1 8/2021 Canberk et al.
11,092,998 B1 8/2021 Castañeda et al.
11,106,342 B1 8/2021 Al Majid et al.
11,126,206 B2 9/2021 Meisenholder et al.
11,143,867 B2 10/2021 Rodriguez, II
11,169,600 B1 11/2021 Canberk et al.
11,227,626 B1 1/2022 Krishnan Gorumkonda et al.
11,307,747 B2 4/2022 Dancie et al.
11,531,402 B1 12/2022 Stolzenberg
11,546,505 B2 1/2023 Canberk
11,797,099 B1 10/2023 Colascione et al.
2009/0012788 A1 1/2009 Gilbert et al.
2011/0301934 A1 12/2011 Tardif
2014/0059365 A1 2/2014 Heo et al.
2014/0118257 A1 5/2014 Baldwin
2014/0171036 A1 6/2014 Simmons
2015/0120293 A1 4/2015 Wohlert et al.
2015/0370320 A1 12/2015 Connor
2016/0357263 A1 12/2016 Antoniac et al.
2017/0123487 A1 5/2017 Hazra et al.
2017/0277684 A1 9/2017 Dharmarajan Mary
2017/0277685 A1 9/2017 Takumi
2017/0351910 A1 12/2017 Elwazer et al.
2018/0053284 A1 2/2018 Rodriguez et al.
2018/0158370 A1 6/2018 Pryor
2018/0357479 A1 12/2018 Swaminathan et al.
2019/0187776 A1 6/2019 Mukherjee et al.
2021/0011612 A1 1/2021 Dancie et al.
2021/0074016 A1 3/2021 Li et al.
2021/0166732 A1 6/2021 Shaburova et al.
2021/0174034 A1 6/2021 Retek et al.
2021/0241529 A1 8/2021 Cowburn et al.
2021/0303075 A1 9/2021 Cowburn et al.
2021/0303077 A1 9/2021 Anvaripour et al.
2021/0303140 A1 9/2021 Mourkogiannis
2021/0366476 A1* 11/2021 Smith .................. G10L 15/083
2021/0382564 A1 12/2021 Blachly et al.
2021/0383796 A1* 12/2021 Coucke .................. G06F 3/167
2021/0397000 A1 12/2021 Rodriguez, II
2021/0405761 A1 12/2021 Canberk
2022/0121288 A1 4/2022 Wu et al.
2022/0180862 A1* 6/2022 Sharifi .................... G10L 15/04
2022/0188539 A1 6/2022 Chan et al.
2022/0189469 A1* 6/2022 Carbune ................. G10L 15/22
2022/0206588 A1 6/2022 Canberk et al.
2022/0291930 A1 9/2022 Litvinov et al.
2022/0300730 A1 9/2022 Eirinberg et al.
2022/0300731 A1 9/2022 Eirinberg et al.
2022/0326781 A1 10/2022 Hwang et al.
2022/0334649 A1 10/2022 Hwang et al.
2024/0062745 A1* 2/2024 Smyth .................. G10L 15/063
2024/0094823 A1 3/2024 Colascione et al.

FOREIGN PATENT DOCUMENTS

KR 20220158824 A 12/2022
WO WO-2015005927 A1 1/2015
WO WO-2016168591 A1 10/2016
WO WO-2019094618 A1 5/2019
WO WO-2022005687 A1 1/2022
WO WO-2022005693 A1 1/2022
WO WO-2022060549 A2 3/2022
WO WO-2022066578 A1 3/2022
WO WO-2022132381 A1 6/2022
WO WO-2022146678 A1 7/2022
WO WO-2022198182 A1 9/2022
WO WO-2022216784 A1 10/2022
WO WO-2022225761 A1 10/2022
WO WO-2022245765 A1 11/2022
WO WO-2024064094 A1 3/2024

OTHER PUBLICATIONS

"U.S. Appl. No. 17/948,004, Notice of Allowance mailed Jun. 12, 2023", 11 pgs.
"U.S. Appl. No. 18/367,278, Non Final Office Action mailed Apr. 11, 2024", 18 pgs.
"U.S. Appl. No. 18/367,278, Notice of Allowance mailed Aug. 15, 2024", 8 pgs.
"U.S. Appl. No. 18/367,278, Response filed Jul. 10, 2024 to Non Final Office Action mailed Apr. 11, 2024", 8 pgs.
"International Application Serial No. PCT/US2023/033063, International Search Report mailed Jan. 18, 2024", 5 pgs.
"International Application Serial No. PCT/US2023/033063, Written Opinion mailed Jan. 18, 2024", 9 pgs.
"International Application Serial No. PCT/US2023/033063, International Preliminary Report on Patentability mailed Apr. 3, 2025", 11 pgs.
"European Application Serial No. 23786890.6, Response to Communication pursuant to Rules 161(1) and 162 EPC filed Oct. 29, 2025", 23 pgs.
"Korean Application Serial No. 10-2025-7012382, Notice of Preliminary Rejection mailed Jun. 4, 2026", w/ English translation, 10 pgs.

* cited by examiner

VISUAL AND AUDIO WAKE COMMANDS

PRIORITY CLAIM

This application is a continuation of U.S. patent application Ser. No. 18/367,278, filed Sep. 12, 2023, which is a continuation of and claims the benefit of U.S. patent application Ser. No. 17/948,004, filed on Sep. 19, 2022, which are hereby incorporated by reference in their entireties.

TECHNICAL FIELD

The present disclosure relates generally to user interfaces and more particularly to user interfaces used in augmented and virtual reality.

BACKGROUND

A head-worn device may be implemented with a transparent or semi-transparent display through which a user of the head-worn device can view the surrounding environment. Such devices enable a user to see through the transparent or semi-transparent display to view the surrounding environment, and to also see objects (e.g., virtual objects such as a rendering of a 2D or 3D graphic model, images, video, text, and so forth) that are generated for display to appear as a part of, and/or overlaid upon, the surrounding environment. This is typically referred to as "augmented reality" or "AR." A head-worn device may additionally completely occlude a user's visual field and display a virtual environment through which a user may move or be moved. This is typically referred to as "virtual reality" or "VR." As used herein, the term AR refers to either or both augmented reality and virtual reality as traditionally understood, unless the context indicates otherwise.

AR systems suspend themselves, such as entering a sleep mode, frequently in order to conserve power and extend usage time. Therefore, it is desirable for AR systems to provide a mechanism for a user of an AR system to unsuspend or wake an AR system.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
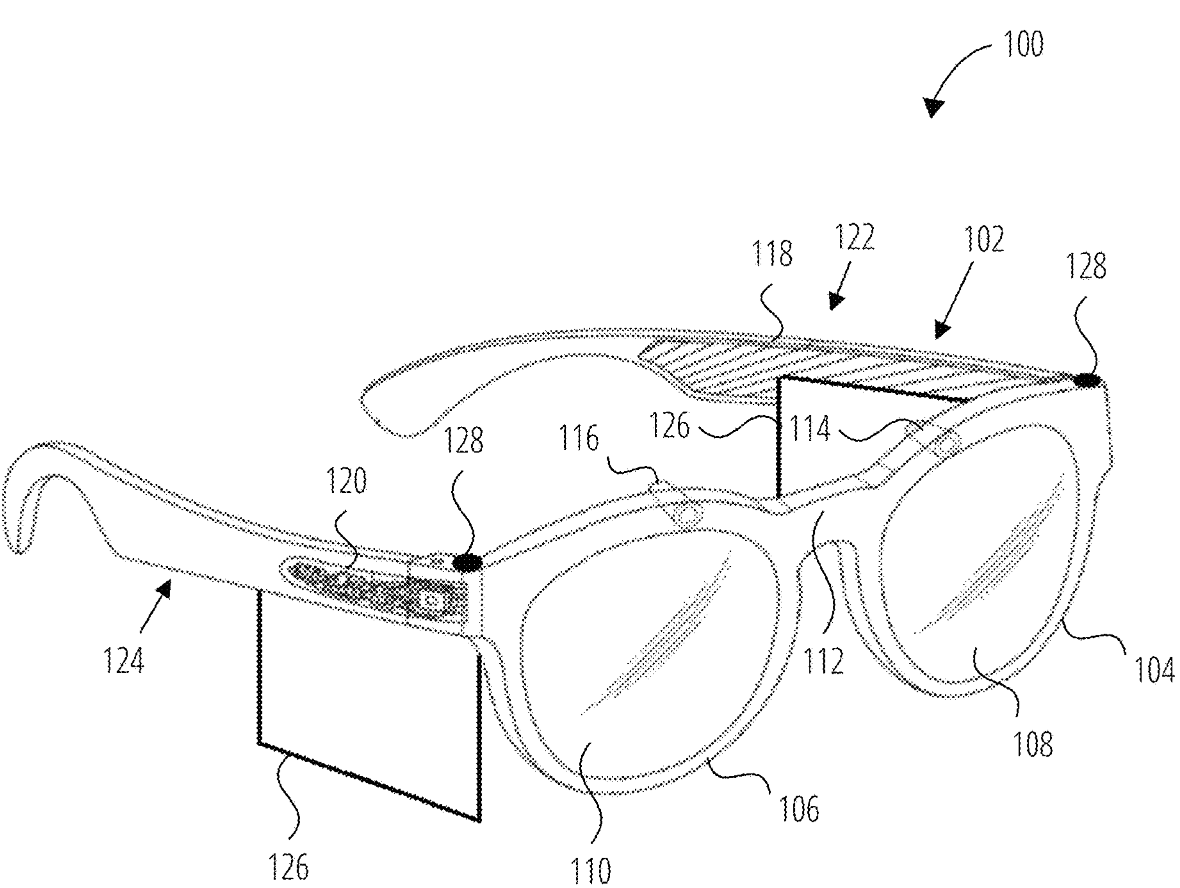
FIG. 1 is a perspective view of a head-worn device, in accordance with some examples.

AR systems are limited when it comes to available user input modalities. As compared other mobile devices, such as mobile phones, it is more complicated for a user of an AR system to indicate user intent and invoke an action or application. When using a mobile phone, a user may go to a home screen and tap on a specific icon to start an application. However, because of a lack of a physical input device such as a touchscreen or keyboard, such interactions are not as easily performed on an AR system. Typically, users can indicate their intent by pressing a limited number of hardware buttons or using a small touchpad. Therefore, it would be desirable to have an input modality that allowed for a greater range of inputs that could be utilized by a user to indicate their intent through a user input.

In some examples, an input modality utilized by an AR system is recognition of gestures made by a user that do not involve Direct Manipulation of Virtual Objects (DMVO). The gestures are made by a user moving and positioning portions of the user's body while those portions of the user's body are detectable by an AR system while the user is wearing the AR system. The detectable portions of the user's body may include portions of the user's upper body, arms, hands, and fingers. Components of a gesture may include the movement of the user's arms and hands, location of the user's arms and hands in space, and positions in which the user holds their upper body, arms, hands, and fingers. Gestures are useful in providing an AR experience for a user as they offer a way of providing user inputs into the AR system during an AR experience without having the user take their focus off of the AR experience. As an example, in an AR experience that is an operational manual for a piece of machinery, the user may simultaneously view the piece of machinery in the real-world scene through the lenses of the AR system, view an AR overlay on the real-world scene view of the machinery, and provide user inputs into the AR system.

AR systems have a limited power and thermal budget. In order to conserve power, they may put themselves into a suspended mode when not in use and enter a low power state. It is desirable that a user can signal the AR system to come out of the suspended mode so that the user can interact with the AR system. Such a signal may be a hand gesture similar to other gestures that form the AR systems hand-tracking interaction language. However, recognizing hand gestures in general may require power for computational resources that may not be available in a suspended mode.

In some examples, a camera component of an AR system recognizes a conservative approximation of a possible visual wake command used as a wake command and wakes the AR system when the visual wake command is recognized placing the AR system in a fully operational mode. In the fully operational mode, the AR system verifies that the possible visual wake command is indeed a visual wake command, and the AR system initiates an interactive session.

In some examples, the AR system recognizes a possible visual wake command used as a wake command when the AR system is in a suspended mode. The AR system includes a camera component that is part of the hand-tracking input pipeline and has a trained onboard visual command classifier capability that recognizes a conservative approximation of the visual wake command with high recall, but low precision. While in the suspended mode, the AR system uses the camera component's onboard visual command classifier to recognize possible visual wake commands based on video frame data generated by a camera of the camera component. When the onboard visual command classifier of the camera component recognizes a possible visual wake command, the AR system wakes the remaining components of the hand-tracking input pipeline. The hand-tracking input pipeline is tentatively awakened and evaluates the possible visual wake command using the full high-precision, high-recall hand-tracking model that recognizes the visual wake command at the same accuracy as it recognizes other gestures. The AR system returns to the suspended mode if the hand-tracking input pipeline does not recognize the possible visual wake command as being the visual wake command or initiates an interactive user session (at full power) if the possible visual wake command that the onboard visual command classifier of the camera component tentatively recognized is in fact the visual wake command.

In some examples, the AR system also recognizes and processes audio data that may contain an audio wake command.

Other technical features may be readily apparent to one skilled in the art from the following figures, descriptions, and claims.

FIG. 1 is a perspective view of a head-worn AR system (e.g., glasses 100 of FIG. 1), in accordance with some examples. The glasses 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing. Any suitable display assembly can be provided in the glasses 100.

The frame 102 additionally includes a left arm or temple piece 122 and a right arm or temple piece 124. In some examples the frame 102 can be formed from a single piece of material so as to have a unitary or integral construction.

The glasses 100 can include a computing device, such as a computer 120, which can be of any suitable type so as to be carried by the frame 102 and, in one or more examples, of a suitable size and shape, so as to be partially disposed in one of the temple piece 122 or the temple piece 124. The computer 120 can include one or more processors with memory, wireless communication circuitry, and a power source. As discussed below, the computer 120 comprises low-power circuitry, high-speed circuitry, and a display processor. Various other examples may include these elements in different configurations or integrated together in different ways. Additional details of aspects of computer 120 may be implemented as illustrated by the data processor 802 discussed below.

The computer 120 additionally includes a battery 118 or other suitable portable power supply. In some examples, the battery 118 is disposed in left temple piece 122 and is electrically coupled to the computer 120 disposed in the right temple piece 124. The glasses 100 can include a connector or port (not shown) suitable for charging the battery 118, a wireless receiver, transmitter or transceiver (not shown), or a combination of such devices.

The glasses 100 include a first or left camera 114 and a second or right camera 116. Although two cameras are depicted, other examples contemplate the use of a single or additional (i.e., more than two) cameras. In one or more examples, the glasses 100 include any number of input sensors or other input/output devices in addition to the left camera 114 and the right camera 116. Such sensors or input/output devices can additionally include biometric sensors, location sensors, motion sensors, and so forth.

In some examples, the left camera 114 and the right camera 116 provide video frame data for use by the glasses 100 to extract 3D information from a real-world scene.

The glasses 100 may also include a touchpad 126 mounted to or integrated with one or both of the left temple piece 122 and right temple piece 124. The touchpad 126 is generally vertically-arranged, approximately parallel to a user's temple in some examples. As used herein, generally vertically aligned means that the touchpad is more vertical than horizontal, although potentially more vertical than that. Additional user input may be provided by one or more buttons 128, which in the illustrated examples are provided on the outer upper edges of the left optical element holder 104 and right optical element holder 106. The one or more touchpads 126 and buttons 128 provide a means whereby the glasses 100 can receive input from a user of the glasses 100.

Figure 2:
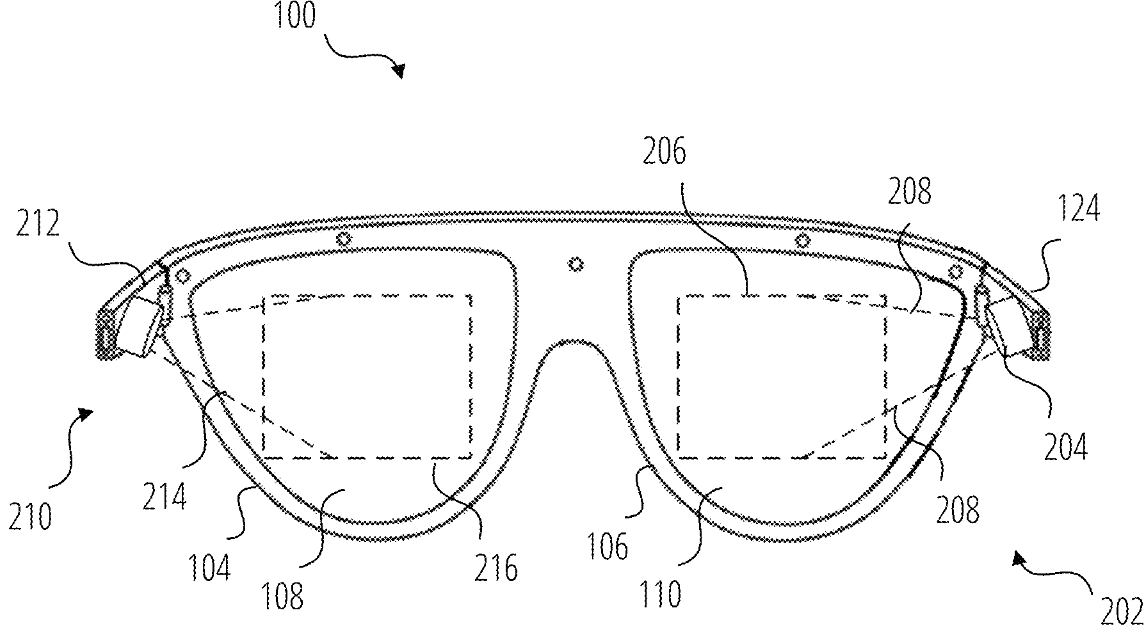
FIG. 2 illustrates a further view of the head-worn device of FIG. 1, in accordance with some examples.

FIG. 2 illustrates the glasses 100 from the perspective of a user. For clarity, a number of the elements shown in FIG. 1 have been omitted. As described in FIG. 1, the glasses 100 shown in FIG. 2 include left optical element 108 and right optical element 110 secured within the left optical element holder 104 and the right optical element holder 106 respectively.

The glasses 100 include forward optical assembly 202 comprising a right projector 204 and a right near eye display 206, and a forward optical assembly 210 including a left projector 212 and a left near eye display 216.

In some examples, the near eye displays are waveguides. The waveguides include reflective or diffractive structures (e.g., gratings and/or optical elements such as mirrors, lenses, or prisms). Light 208 emitted by the projector 204 encounters the diffractive structures of the waveguide of the near eye display 206, which directs the light towards the right eye of a user to provide an image on or in the right optical element 110 that overlays the view of the real-world scene seen by the user. Similarly, light 214 emitted by the projector 212 encounters the diffractive structures of the waveguide of the near eye display 216, which directs the light towards the left eye of a user to provide an image on or in the left optical element 108 that overlays the view of the real-world scene seen by the user. The combination of a GPU, the forward optical assembly 202, the left optical element 108, and the right optical element 110 provide an optical engine of the glasses 100. The glasses 100 use the optical engine to generate an overlay of the real-world scene view of the user including display of a user interface to the user of the glasses 100.

It will be appreciated however that other display technologies or configurations may be utilized within an optical engine to display an image to a user in the user's field of view. For example, instead of a projector 204 and a waveguide, an LCD, LED or other display panel or surface may be provided.

In use, a user of the glasses 100 will be presented with information, content and various user interfaces on the near eye displays. As described in more detail herein, the user can then interact with the glasses 100 using a touchpad 126 and/or the buttons 128, voice inputs or touch inputs on an associated device (e.g. client device 826 illustrated in FIG. 8), and/or hand movements, locations, and positions recognized by the glasses 100.

Figure 3:
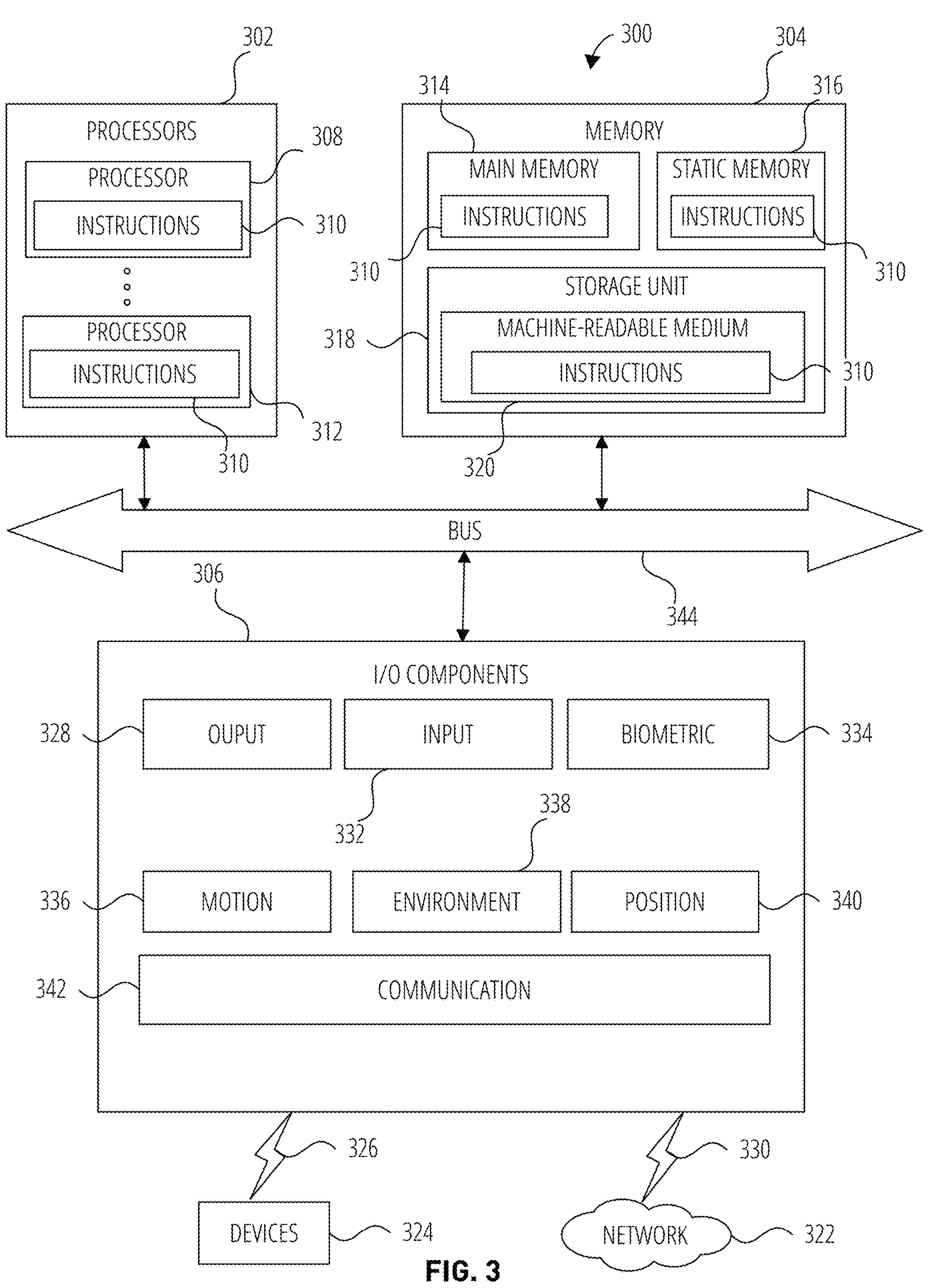
FIG. 3 is a diagrammatic representation of a machine, in the form of a computing apparatus within which a set of instructions may be executed for causing the machine to perform any one or more of the methodologies discussed herein in accordance with some examples.

FIG. 3 is a diagrammatic representation of a machine 300 (such as a computing apparatus) within which instructions 310 (e.g., software, a program, an application, an applet, an app, or other executable code) for causing the machine 300 to perform any one or more of the methodologies discussed herein may be executed. The machine 300 may be utilized as a computer 120 of glasses 100 of FIG. 1. For example, the instructions 310 may cause the machine 300 to execute any one or more of the methods described herein. The instructions 310 transform the general, non-programmed machine 300 into a particular machine 300 programmed to carry out the described and illustrated functions in the manner described. The machine 300 may operate as a standalone device or may be coupled (e.g., networked) to other machines. In a networked deployment, the machine 300 may operate in the capacity of a server machine or a client machine in a server-client network environment, or as a peer machine in a peer-to-peer (or distributed) network environment. The machine 300 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a head-worn device (e.g., a smart watch), a smart home device (e.g., a smart appliance), other smart devices, a web appliance, a network router, a network switch, a network bridge, or any machine capable of executing the instructions 310, sequentially or otherwise, that specify actions to be taken by the machine 300. Further, while a single machine 300 is illustrated, the term "machine" may also be taken to include a collection of machines that individually or jointly execute the instructions 310 to perform any one or more of the methodologies discussed herein.

The machine 300 may include processors 302, memory 304, and I/O components 306, which may be configured to communicate with one another via a bus 344. In some examples, the processors 302 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 308 and a processor 312 that execute the instructions 310. The term "processor" is intended to include multi-core processors that may comprise two or more independent processors (sometimes referred to as "cores") that may execute instructions contemporaneously. Although FIG. 3 shows multiple processors 302, the machine 300 may include a single processor with a single core, a single processor with multiple cores (e.g., a multi-core processor), multiple processors with a single core, multiple processors with multiples cores, or any combination thereof.

The memory 304 includes a main memory 314, a static memory 316, and a storage unit 318, both accessible to the processors 302 via the bus 344. The main memory 304, the static memory 316, and storage unit 318 store the instructions 310 embodying any one or more of the methodologies or functions described herein. The instructions 310 may also reside, completely or partially, within the main memory 314, within the static memory 316, within machine-readable medium 320 within the storage unit 318, within one or more of the processors 302 (e.g., within the processor's cache memory), or any suitable combination thereof, during execution thereof by the machine 300.

The I/O components 306 may include a wide variety of components to receive input, provide output, produce output, transmit information, exchange information, capture measurements, and so on. The specific I/O components 306 that are included in a particular machine will depend on the type of machine. For example, portable machines such as mobile phones may include a touch input device or other such input mechanisms, while a headless server machine will likely not include such a touch input device. It will be appreciated that the I/O components 306 may include many other components that are not shown in FIG. 3. In various examples, the I/O components 306 may include output components 328 and input components 332. The output components 328 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 332 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 306 may include biometric components 334, motion components 336, environmental components 338, or position components 340, among a wide array of other components. For example, the biometric components 334 include components to recognize expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 336 may include inertial measurement units (IMUs), acceleration sensor components (e.g., accelerometer), gravitation sensor components, rotation sensor components (e.g., gyroscope), and so forth. The environmental components 338 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals associated to a surrounding physical environment. The position components 340 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 306 further include communication components 342 operable to couple the machine 300 to a network 322 or devices 324 via a coupling 330 and a coupling 326, respectively. For example, the communication components 342 may include a network interface component or another suitable device to interface with the network 322. In further examples, the communication components 342 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 324 may be another machine or any of a wide variety of peripheral devices (e.g., a peripheral device coupled via a USB).

Moreover, the communication components 342 may detect identifiers or include components operable to detect identifiers. For example, the communication components 342 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 342, such as location via Internet Protocol (IP) geolocation, location via Wi-Fi® signal triangulation, location via detecting an NFC beacon signal that may indicate a particular location, and so forth.

The various memories (e.g., memory 304, main memory 314, static memory 316, and/or memory of the processors 302) and/or storage unit 318 may store one or more sets of instructions and data structures (e.g., software) embodying or used by any one or more of the methodologies or functions described herein. These instructions (e.g., the instructions 310), when executed by processors 302, cause various operations to implement the disclosed examples.

The instructions 310 may be transmitted or received over the network 322, using a transmission medium, via a network interface device (e.g., a network interface component included in the communication components 342) and using any one of a number of well-known transfer protocols (e.g., hypertext transfer protocol (HTTP)). Similarly, the instructions 310 may be transmitted or received using a transmission medium via the coupling 326 (e.g., a peer-to-peer coupling) to the devices 324.

Figure 4A:
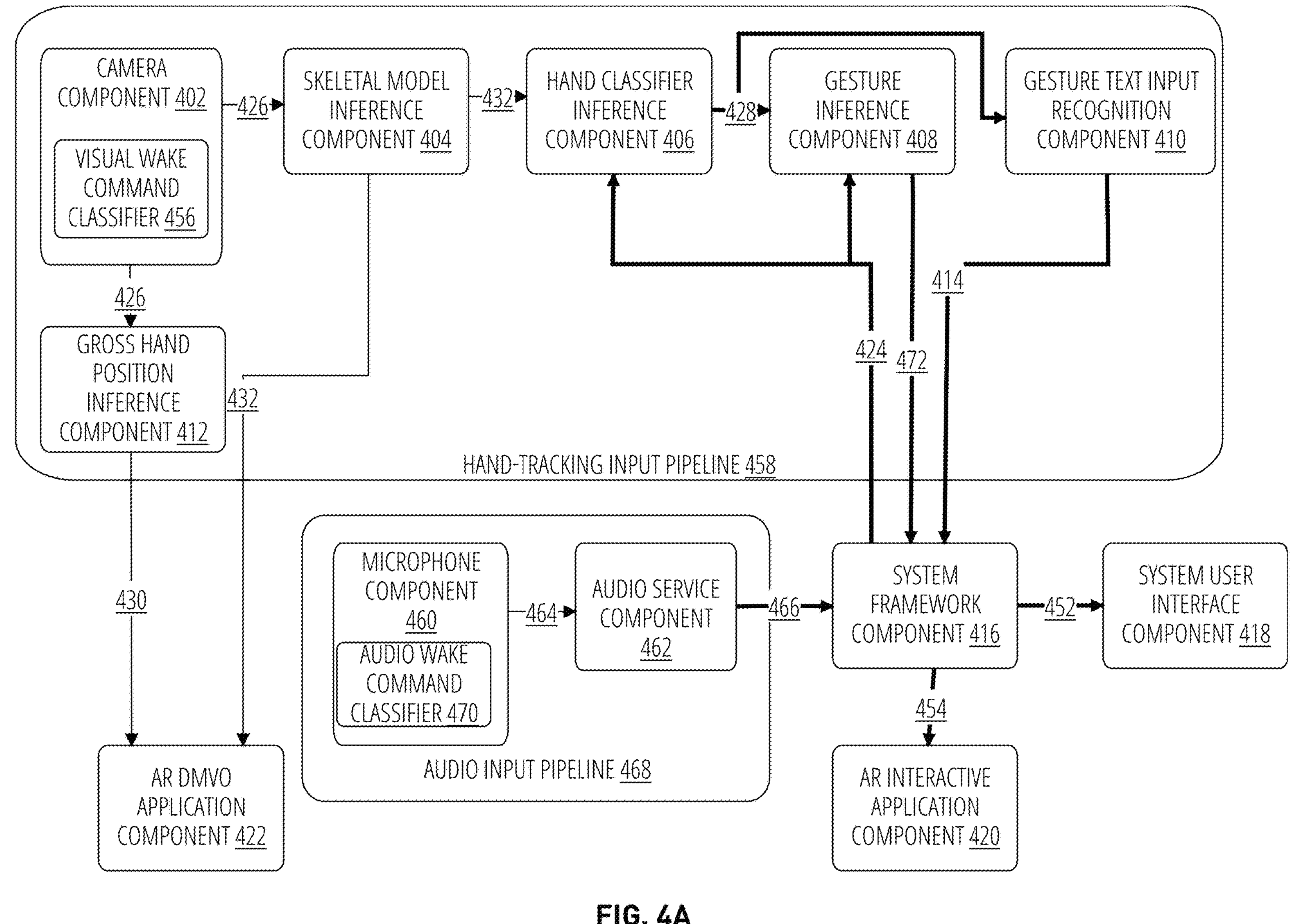
FIG. 4A is collaboration diagram of a hand-tracking input pipeline of an AR system in accordance with some examples.
Figure 4B:
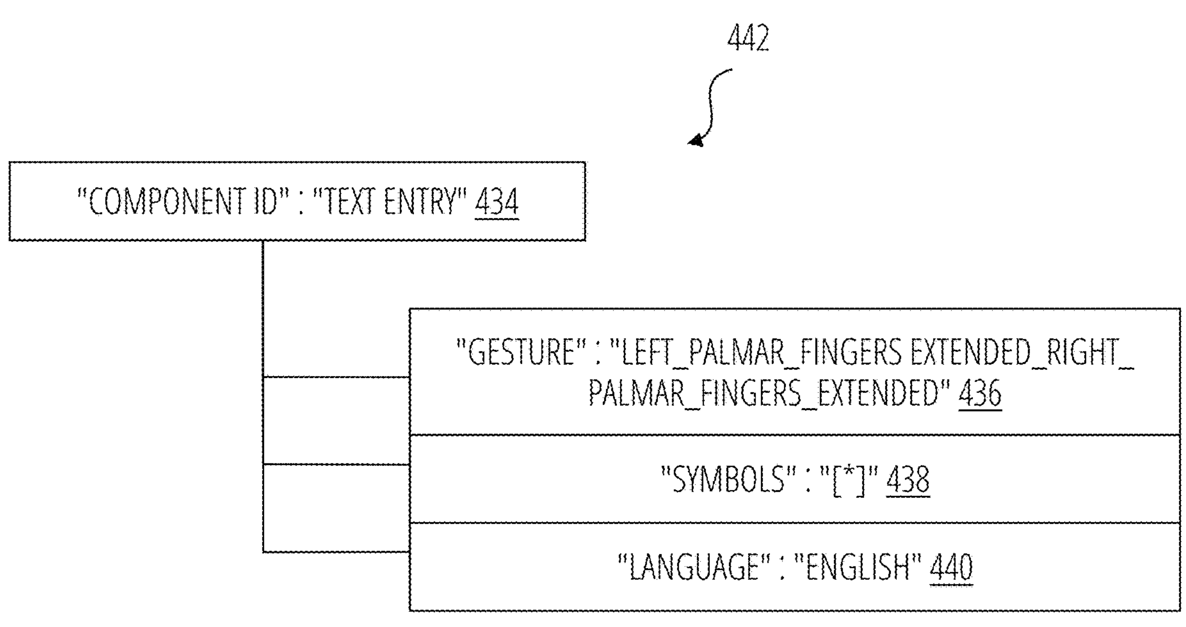
FIG. 4B is an illustration of a data structure in accordance with some examples.
Figure 4C:
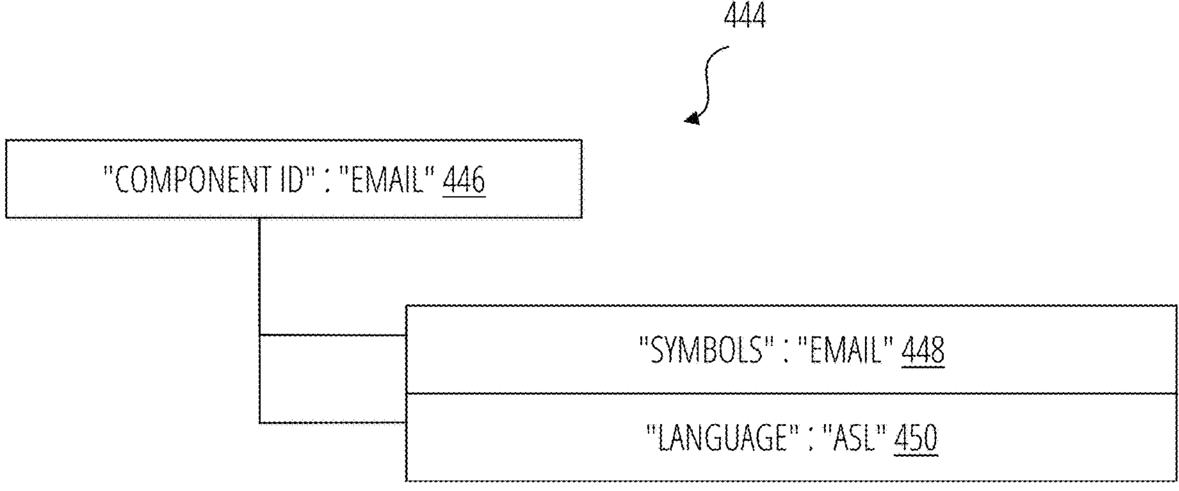
FIG. 4C is an illustration of another data structure in accordance with some examples.

FIG. 4A is collaboration diagram of a hand-tracking input pipeline 458 of an AR system, such as glasses 100, and FIG. 4B and FIG. 4C are illustrations of data structures in accordance with some examples. A camera component 402 generates real-world scene frame data 426 of a real-world scene from a perspective of a user of the AR system using one or more cameras of the AR system, such as cameras 114 and 116 of FIG. 1. The camera component 402 communicates the real-world scene frame data 426 to a skeletal model inference component 404. Included in the real-world scene frame data 426 are tracking video frame data of detectable portions of the user's body including portions of the user's upper body, arms, hands, and fingers. The tracking video frame data includes video frame data of movement of portions of the user's upper body, arms, and hands as the user makes a gesture or moves their hands and fingers to interact with a real-world scene; video frame data of locations of the user's arms and hands in space as the user makes the gesture or moves their hands and fingers to interact with the real-world scene; and video frame data of positions in which the user holds their upper body, arms, hands, and fingers as the user makes the gesture or moves their hands and fingers to interact with the real-world scene. In some examples, the camera component 402 includes a visual wake command classifier 456 that can be used to recognize a gesture made by a user using the AR system intended as a visual wake command. In some examples, the visual wake command classifier 456 recognizes conservative approximations of a visual wake command being made by a user with high recall, but low precision. In some examples, the visual wake command classifier 456 is a neural network trained using machine learning methodologies to recognize the visual wake command.

The skeletal model inference component 404 scans for, recognizes, and tracks landmarks on portions of the user's upper body, arms, and hands in the real-world scene. In some examples, the skeletal model inference component 404 receives real-world scene frame data 426 from the camera component 402 and extracts features of the user's upper body, arms, and hands from the tracking video frame data included in the real-world scene frame data 426. The skeletal model inference component 404 generates skeletal model data 432 based on the extracted features. The skeletal model data 432 includes landmark data including landmark identification, location in the real-world scene, and categorization information of one or more landmarks associated with the user's upper body, arms, and hands. The skeletal model inference component 404 communicates the skeletal model data 432 to the hand classifier inference component 406. In addition, the skeletal model inference component 404 makes the skeletal model data 432 available to an application being executed on the AR system, such as AR DMVO application component 422.

The camera component 402 communicates the real-world scene frame data 426 to a gross hand position inference component 412. The gross hand position inference component 412 generates coordinate transformation data 430 based on the real-world scene frame data 426. The coordinate transformation data 430 includes a continuously-updated transformation from a coordinate system of a skeletal model of the skeletal model data 432 and a coordinate system of the AR system's user coordinate system. In some examples, the object gross hand position inference component 412 receives real-world scene video real-world scene frame data 426 of a real-world scene and extracts features of objects in the real-world scene including the user's upper body, arms, and hands from the real-world scene video frame data. The object gross hand position inference component 412 generates coordinate transformation data 430 based on the extracted features. The gross hand position inference component 412 communicates the coordinate transformation data 430 to the AR DMVO application component 422.

The hand classifier inference component 406 receives the skeletal model data 432 from the skeletal model inference component 404 and generates hand classifier probability data 428 based on the skeletal model data 432. Gestures are specified by the hand-tracking input pipeline 458 in terms of combinations of hand classifiers. The hand classifiers are in turn composed of combinations and relationships of landmarks included in the skeletal model data 432. As the hand-tracking input pipeline 458 extracts hand classifiers from the skeletal model data 432 by the hand-tracking input pipeline 458 in a layer distinct from assembly of hand movements into gestures, a designer of the AR system may create new gestures built out of existing hand classifiers composing already known gestures without having to re-train machine learning components of the hand-tracking input pipeline 458. In some examples, the hand classifier inference component 406 compares one or more skeletal model included in skeletal model data 432 to previously generated hand classifier models and generates one or more hand classifier probabilities on the basis of the comparison. The one or more hand classifier probabilities indicate a probability that a specified hand classifier can be identified from the skeletal model data 432. The hand classifier inference component 406 generates hand classifier probability data 428 based on the one or more hand classifier probabilities. In additional examples, the hand classifier inference component 406 determines the one or more hand classifier probabilities on a basis of categorizing the skeletal model using artificial intelligence methodologies and a hand classifier model previously generated using machine learning methodologies. The hand classifier inference component 406 communicates that hand classifier probability data 428 to a gesture inference component 408 and a gesture text input recognition component 410.

The gesture inference component 408 receives the hand classifier probability data 428 and determines audio data 466 based on the hand classifier probability data 428. In some examples, the gesture inference component 408 compares hand classifiers identified in the hand classifier probability data 428 to gesture identification data identifying specific gestures. A gesture identification is composed of one or more hand classifiers that correspond to a specific gesture. A gesture identification is defined using a grammar whose symbols correspond to hand classifiers. For example, a gesture identification for a gesture is "LEFT_PALMAR_FINGERS EXTENDED_RIGHT PALMAR_FINGERS_EXTENDED" where: "LEFT" is a symbol corresponding to a hand classifier indicating that the user's left hand has been recognized; "PALMAR" is a symbol corresponding to a hand classifier indicating that a palm of a hand of the user has been recognized and modifies "LEFT" to indicate that the user's left hand palm has been recognized; "FINGERS" is a symbol corresponding to a hand classifier indicating that the user's fingers have been recognized; and "EXTENDED" is a symbol corresponding to a hand classifier indicating that the user's fingers are extended and modifies "FINGERS". In additional examples, a gesture identification is a single token, such as a number, identifying a gesture based on the gesture's component hand classifiers. A gesture identification identifies a gesture in the context of a physical description of the gesture. The gesture inference component 408 communicates the 466 to a system framework component 416.

The gesture text input recognition component 410 receives the hand classifier probability data 428 and generates symbol data 414 based on the hand classifier probability data 428. In some examples, the gesture inference component 408 compares hand classifiers identified in the hand classifier probability data 428 to symbol data identifying specific characters, words, and commands. For example, symbol data for a gesture is the character "V" as a gesture that is a fingerspelling sign in American Sign Language (ASL). The individual hand classifiers for the gesture may be "LEFT" for left hand, "PALMAR" for the palm of the left hand, "INDEXFINGER" for the index finger "EXTENDED" modifying "INDEXFINGER", "MIDDLEFINGER" for the middle finger, "EXTENDED" modifying "MIDDLEFINGER", "RINGFINGER" for the ring finger, "CURLED" modifying "RINGFINGER", "LITTLEFINGER" for the little finger, "CURLED" modifying "LITTLEFINGER", "THUMB" for the thumb and "CURLED" modifying "THUMB".

In some examples, entire words may also be identified by the gesture text input recognition component 410 based on hand classifiers indicated by the hand classifier probability data 428. In additional examples, a command, such as command corresponding to a specified set of keystrokes in an input system having a keyboard, may be identified by the gesture text input recognition component 410 based on hand classifiers indicated by the hand classifier probability data 428.

The gesture inference component 408 and the gesture text input recognition component 410 communicate the audio data 466 and symbol data 414, respectively, to a system framework component 416. The system framework component 416 receives the audio data 466 and the symbol data 414 (collectively and separately "input event data") and generates undirected input event data 452 or directed input event data 454 based in part on the input event data. Undirected input events belonging to an undirected class of input events are routed to operating system level components, such as a system user interface component 418. Directed input events belonging to a directed class of input events are routed to a target component such as an AR interactive application component 420.

In some examples of processing input data received from the gesture inference component 408 and the gesture text input recognition component 410 that are classifiable as undirected input event data 452, the system framework component 416 classifies the input data as undirected input event data 452 based on the input data and component registration data described below. The system framework component 416, on the basis of classifying that the input data as undirected input event data 452, routes the input data as undirected input event data 452 to the system user interface component 418.

The system user interface component 418 receives the undirected input event data 452 and determines a target component based on a user's indication or selection of a virtual object associated with the target component while making a gesture corresponding to the undirected input event data 452. In some examples, the system user interface component 418 determines a location in the real-world scene of the user's hand while making the gesture. The system user interface component 418 determines a set of virtual objects that are currently being provided by the AR system to the user in an AR experience. The system user interface component 418 determines a virtual object whose apparent location in the real-world scene correlates to the location in the real-world scene of the user's hand while making the gesture. The system user interface component 418 determines the target AR application component by looking up, in internal data structures of the AR system, an AR application component to which the virtual object is associated and determines that AR application component as the target AR application component.

The system user interface component 418 registers the target AR application component to which the directed input event data 454 is to be routed with the system framework component 416. The system framework component 416 stores component registration data, such as component registration data 442 of FIG. 4B, in a datastore do be accessed during operation of the system framework component 416. The component registration data 442 includes a component ID field 434 identifying a target AR application component. The component registration data 442 further includes a registered language field 440 identifying a language model to be associated with the target AR application component. The language model is a look-ahead language specific model that can be used to help predict a next input symbol when the hand-tracking input pipeline 458 is being used to input text as individual characters or as words. The component registration data 442 further includes one or more registered gesture fields 436 and/or registered symbols fields 438 indicating gestures and symbols that are to be routed to the registered AR application component. As illustrated, the component ID field 434 includes an AR application component identification "TEXT ENTRY"; the registered language field 440 identifies a language associated with the registered AR application component, namely "ENGLISH"; the registered gesture field 436 includes a gesture identification, namely "LEFT_PALMAR_FINGERS EXTENDED_RIGHT_PALMAR_FINGERS_EXTENDED", that are routed to the registered target AR application component, and registered symbols field 438 identifying a set of symbols, namely "[*]" signifying all symbols, that are routed to the registered AR application component.

As another example of component registration data, component registration data 444 of FIG. 4C includes a component ID field 446 including an AR application component identification "EMAIL"; a registered language field 440 identifying a language associated with the registered AR application component, namely "ASL", and registered symbol field 448 identifying a set of symbols, namely the word "EMAIL", that are routed to the registered AR application component.

Referring again to FIG. 4A and the system framework component 416, processing input data received from the gesture inference component 408 and the gesture text input recognition component 410 that are classifiable as undirected input event data 452, the system framework component 416 classifies input data received from the gesture inference component 408 and the gesture text input recognition component 410 as either undirected input event data 452 or directed input event data 454 based on the input data and component registration data. In some examples, when processing symbol data 414, the system framework component 416 searches registered symbols fields of the component registration data, such as registered symbols field 438 of component registration data 442, for registered symbols that match the symbol data. When the system framework component 416 determines a match, the system framework component 416 determines that the symbol data is directed input event data 454. The system framework component 416 also determines a target AR application component based on a target AR application component identified in a component ID field, such as component ID field 434, of the component registration data including the matched registered symbols. In a similar manner, when processing audio data 466, the system framework component 416 searches the registered gesture fields of the component registration data, such as registered gesture field 436 of component registration data 442, for registered gestures that match the gesture input data. When the system framework component 416 determines a match, the system framework component 416 determines that the gesture input data is directed input event data 454 and also determines a target AR application component to which the directed input event data 454 is to be routed. In a case the system framework component 416 determines that the symbol data and/or the gesture input data of the input data are not found in the component registration data, the 416 determines that the input data are to be classified as undirected input event data 452 and are to be routed to the system user interface component 418.

In another example of processing directed input event data 454, an AR application component, such as the AR interactive application component 420, registers itself with the system framework component 416. To do so, the AR application component communicates component registration data, such as component registration data 442 of FIG. 4B, to the system framework component 416. The system framework component 416 receives the component registration data and stores the component registration data in a datastore for use in routing directed input event data 454 to the AR application component.

In another example of processing directed input event data 454, the AR system determines that the directed input event data 454 is to be routed to an AR application component based on an implication. For example, if the AR system is executing a current AR application component in a single-application modal state, the current AR application component is implied as the AR application component to which the directed input event data 454 are routed.

In some examples, the system framework component 416 communicates feedback data 424 to the hand classifier inference component 406 and the gesture inference component 408 in order to improve the accuracy of the inferences made by the hand classifier inference component 406 and gesture inference component 408. In some examples, the system framework component 416 generates the feedback data 424 based on user context data such as component registration data of the registered AR application components and data about hand classifiers composing the registered gestures and composing gestures associated with the registered symbols. The component registration data includes information of gestures and symbols in the audio data 466 and symbol data 414 routed to the AR application component as part of directed input event data 454, as well as a language of the symbols. In addition, the system framework component 416 includes information about compositions of specific gestures including hand classifiers that are associated with the gestures and symbols.

In another example of processing feedback data 424, the system framework component 416 communicates hints as part of the feedback data 424 to the hand classifier inference component 406, gesture inference component 408, and gesture text input recognition component 410. The system framework component 416 generates the hints based on a language model associated with an AR application component, such as by being specified in the registered language field 450 in component registration data 444. The gesture text input recognition component 410 determines a probable next symbol N based on previous characters N−1, N−2, and so forth, and the language model. In some examples, the system framework component 416 generates the hints based on a language model that is a hidden Markov model predicting what the next symbol N is based on one or more of the previous characters N−1, N−2, and so forth, In another example, the gesture text input recognition component 410 uses AI methodologies to generate the next symbol N based on a language model that is generated using machine learning methodologies. The system framework component 416 generates the hints based on the next symbol N. In some examples, the system framework component 416 determines a next gesture associated with the next symbol N by mapping the next symbol N to a next gesture based on a lookup table associating symbols with gestures. The system framework component 416 decomposes the next gesture to a set of one or more next hand classifiers. The system framework component 416 communicates the next gesture to the gesture inference component 408 as part of feedback data 424 and communicates the set of next hand classifiers to the hand classifier inference component 406 as part of feedback data 424.

AR application components executed by the AR system, such as AR DMVO application component 422, system user interface component 418, and AR interactive application component 420, are consumers of the data generated by the hand-tracking input pipeline 458, such as coordinate transformation data 430, skeletal model data 432, audio data 466, and symbol data 414. The AR system executes the AR DMVO application component 422 to provide a user interface to a user of the AR system utilizing direct manipulation of visual objects within a 2D or 3D user interface. The AR system executes the system user interface component 418 to provide a system-level user interface to the user of the AR system, such as a command console or the like, utilizing gestures as an input modality. The AR system executes the AR interactive application component 420 to provide a user interface to a user of the AR system, such as an AR experience, utilizing gestures as an input modality.

In some examples, the camera component 402, skeletal model inference component 404, and gross hand position inference component 412 communicate using an automatically synchronized shared-memory buffer. In addition, the skeletal model inference component 404 and gross hand position inference component 412 publish the skeletal model data 432 and the coordinate transformation data 430, respectively, on a memory buffer that is accessible by components and applications outside of the hand-tracking input pipeline 458, such as the AR DMVO application component 422.

In many examples, the hand classifier inference component 406, the gesture inference component 408, and gesture text input recognition component 410 communicate the hand classifier probability data 428, the audio data 466, and the symbol data 414, respectively, via inter process communication methodologies.

In some examples, the AR system includes an audio input pipeline 468. The audio input pipeline 468 includes a microphone component 460 that captures audio input data 464 of a real-world scene and communicates the audio input data 464 to an audio service component 462. The audio service component 462 receives the audio input data 464 and generates audio data 466 based on the audio input data 464. The audio data 466 includes identified audio events in the real-world scene, including words spoken by a user of the AR system and sounds made by the user such as the user clapping their hands or snapping their fingers, intended as audio commands to the AR system by the user. In some examples, the audio service component 462 generates the audio data 466 on the basis of mapping the audio input data 464 to audio data 466 using artificial intelligence methodologies and an audio event model created using machine learning methodologies.

In some examples, the microphone component 460 includes an onboard audio wake command classifier 470 that can be used to recognize possible audio wake commands being made by a user using the AR system. In some examples, the audio wake command classifier 470 recognizes conservative approximations of audio wake commands being made by a user with high recall, but low precision. In some examples, the audio wake command classifier 470 is a neural network trained using machine learning methodologies to recognize the audio wake command.

In some examples, the hand-tracking input pipeline 458 operates continuously generating and publishing symbol data 414, audio data 466, skeletal model data 432, coordinate transformation data 430 based on the real-world scene frame data 426 generated by the one or more cameras of the AR system.

Figure 5:
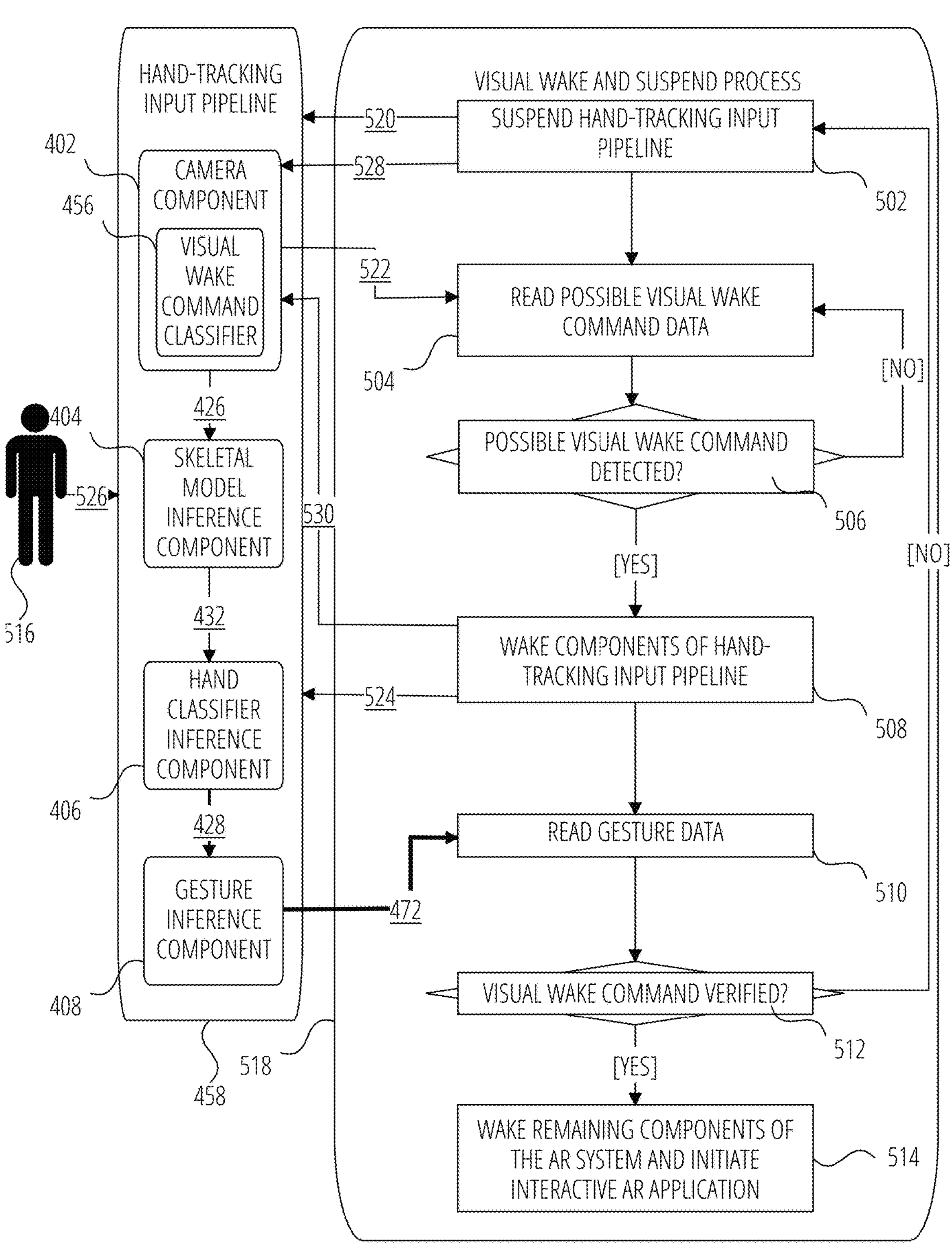
FIG. 5 is an activity diagram of a visual system wake and suspend process of an AR system in accordance with some examples.

FIG. 5 is an activity diagram of a visual wake and suspend process 518 in accordance with some examples. The visual wake and suspend process 518 is executed by an AR system when the AR system is operating in a suspended or sleeping mode.

In operation 502, the AR system suspends one or more components of the hand-tracking input pipeline 458 placing the one or more components in a sleeping or low-power mode while the camera component 402 is placed in a limited operational mode. In some examples, the skeletal model inference component 404, the hand classifier inference component 406, and the gesture inference component 408 are suspended. In some examples, the limited operational mode includes setting the camera component 402 to capture video frame data at a limited frame rate that is a reduced frame rate less than a fully operational frame rate. In some examples, the camera component 402 is set to capture video frame data at a limited resolution that is a reduced resolution less than a fully operational resolution. In some examples, a reduced frame rate of a limited operational mode is 5 frames per second. In some examples, a fully operational frame rate is 30 frames per second.

In some examples, the AR system places the hand-tracking input pipeline 458 in a suspended mode by generating a suspend command 520 and communicating the suspend command 520 to one or more components of the hand-tracking input pipeline 458. In some examples, the AR system places the camera component 402 in a limited operational mode by generating a limited operational mode command 528 and communicating the limited operational mode command 528 to the camera component 402.

The camera component 402 receives the limited operational mode command 528 and begins operating in a limited operational mode. In the limited operational mode, the camera component 402 captures real-world scene frame data at a limited frame rate while the rest of the components of the hand-tracking input pipeline are in a suspended mode. The real-world scene frame data includes gesture video frame data of a visual wake command 526 being made by a user 516 as a wake command. While in the limited operational mode, the visual wake command classifier 456 recognizes gestures that are possible visual wake commands in the tracking video frame data using artificial intelligence methodologies and a visual wake command classifier 456 trained using machine learning methodologies. In some examples, the visual wake command classifier 456 recognizes conservative approximations of gestures being made by a user with high recall, but low precision. The camera component 402 generates possible visual wake command data 522 based on the possible visual wake commands recognized by the visual wake command classifier 456.

In operation 504, the AR system reads the possible visual wake command data 522 generated by the camera component 402. In operation 506, the AR system detects whether or not the user 516 is making a possible visual wake command based on the possible visual wake command data 522. In operation 506, based on detecting that the user 516 is not making a possible visual wake command, the AR system resumes operation 504 and continues to read the possible visual wake command data 522. In operation 508, based on detecting that the user 516 is making a possible visual wake command, the AR system wakes the components of the hand-tracking input pipeline 458. In some examples, the AR system generates a wake command 524 and communicates the wake command 524 to the hand-tracking input pipeline 458. In operation 508, the AR system commands the camera component 402 to enter a fully operational mode. In some examples, the AR system generates a fully operational mode command 530 and communicates the fully operational mode command 530 to the camera component 402. In the fully operational mode, a camera sensor of the camera component 402 captures video frame data at a fully operational frame rate that is higher than a reduced frame rate of a limited operational mode. In some examples, a camera sensor of the camera component 402 captures video frame data at a fully operational resolution that is higher than a reduced frame rate of a limited operational mode. In some examples, the AR system generates a fully operational mode command 530 and communicates the fully operational mode command 530 to the camera component 402.

The hand-tracking input pipeline 458 receives the wake command 524 and wakes one or more sleeping components of the hand-tracking input pipeline 458. In some examples, the skeletal model inference component 404, the hand classifier inference component 406, and the gesture inference component 408 are awakened and begin operating in a fully powered mode. The camera component 402 receives the fully operational mode command 530 and begins capturing video frame data at a fully operational frame rate. The hand-tracking input pipeline 458 processes the real-world scene frame data 426 generated by the camera component 402 at the fully operational frame rate to generate audio data 466 for the AR system to use to determine if the visual wake command 526 being made by the user 516 that was recognized as a possible visual wake command is actually a visual wake command. The hand-tracking input pipeline 458 generates audio data 466 based on the real-world scene frame data 426 generated by the camera component 402. The gesture inference component 408 of the hand-tracking input pipeline 458 communicates the audio data 466 to the AR system. In operation 510, the AR system reads the audio data 466 from the hand-tracking input pipeline 458.

In operation 512, the AR system verifies whether or not the user 516 is actually making a visual wake command based on the gesture data 472. That is the AR system verifies that the possible visual wake command detected in operation 506 based on the possible visual wake command data 522 generated by the camera component 402 in a limited operational mode using the visual wake command classifier 456 is an actual visual wake command based on the gesture data 472 generated by the hand-tracking input pipeline 458 in a fully operational mode. On the basis of verifying that the user 516 is actually making the visual wake command, the AR system enters a fully operational mode and wakes components of the AR system in operation 514 and initiates an interactive AR application, such as AR interactive application component 420, that is presented to the user of the AR system. In some examples, the AR system operates in a suspended mode by lowering a clock frequency of one or more processors, such as processors 302. When the AR system enters a fully operational mode, the AR system increases the clock frequency of the processors 302. In some examples, the AR system operates in a suspended mode by depowering certain components, such as output components 328, biometric components 334, motion components 336, environmental components 338, and position components 340. When the AR system enters a fully operational mode, the AR system powers the depowered components.

In operation 512, on the basis failing to verify that the user 516 is making the visual wake command based on the gesture data 472, the AR system transitions to operation 502. In operation 502, the AR system suspends the hand-tracking input pipeline 458 and places the camera component 402 in a limited operational mode and continues executing the visual wake and suspend process 518 in a low-power mode as described herein.

In some examples, the AR system detects the possible visual wake command and wakes the components of the hand-tracking input pipeline 458 from the suspended mode and the camera component 402 from the limited operational mode while the user is still making the visual wake command 526. This allows the AR system to use the hand-tracking input pipeline 458 to verify that the possible visual wake command detected by the AR system is actually a visual wake command while the user is still making the visual wake command 526. That is, the fully operational hand-tracking input pipeline 458 recognizes the same visual wake command 526 being made by the user 516 that was identified as a possible visual wake command by the visual wake command classifier 456 of the camera component 402 while the hand-tracking input pipeline 458 was in the suspended mode. In some examples, a latency of transitioning from the suspended mode to the fully operational mode by the hand-tracking input pipeline 458 and transitioning from the limited operational mode to the fully operational mode by the camera component 402 is 100 milliseconds.

In some examples a user makes a visual wake command by snapping the fingers of one or both of the user's hands.

In some examples, the visual wake command classifier 456 is a component of the hand-tracking input pipeline 458.

In some examples, the visual wake and suspend process 518 performs the operations of the hand-tracking input pipeline 458.

Figure 6:
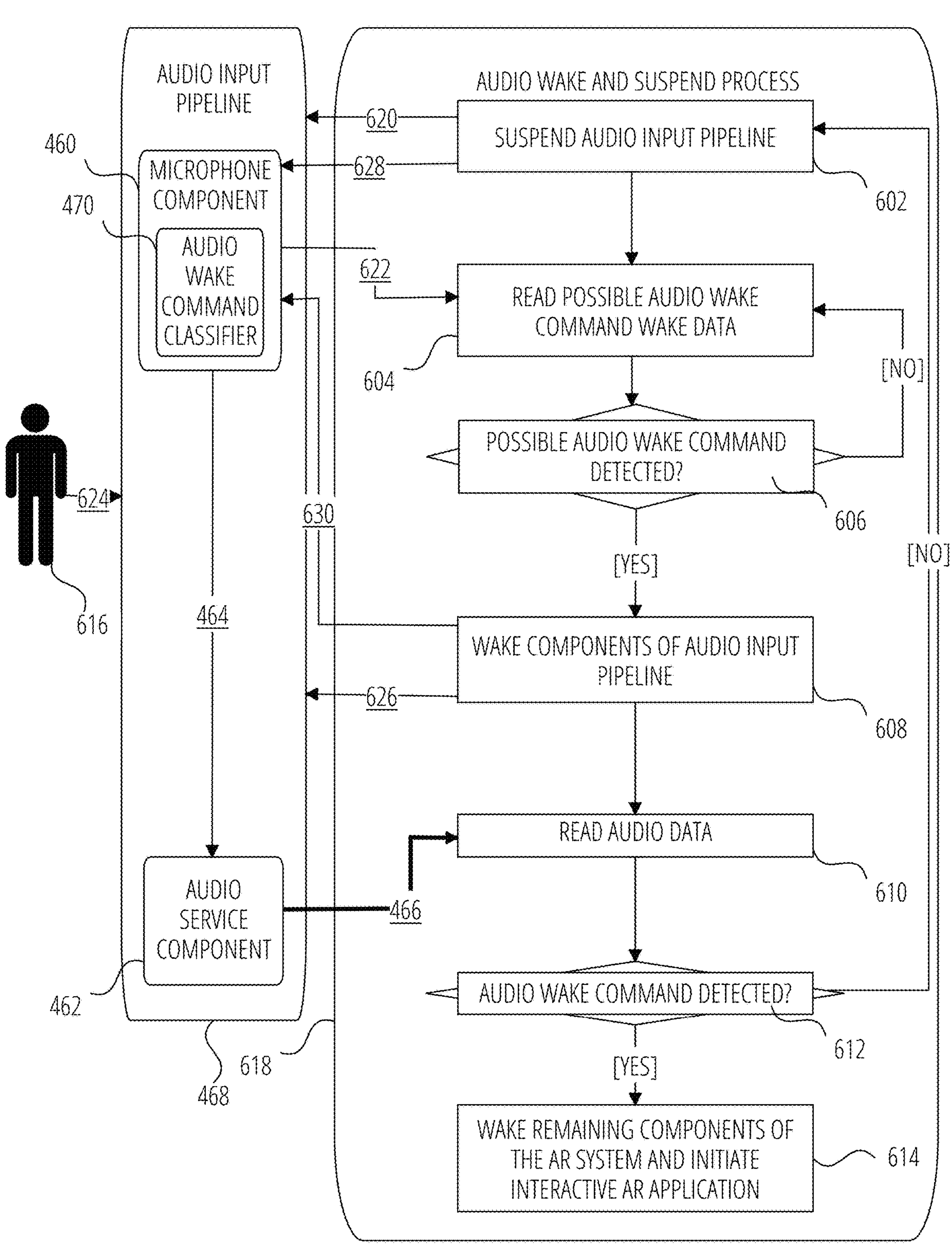
FIG. 6 is an activity diagram of an audio system wake and suspend process of an AR system in accordance with some examples.

FIG. 6 is an activity diagram of an audio wake and suspend process 618 in accordance with some examples. The audio wake and suspend process 618 is executed by an AR system when the AR system is operating in a suspended or sleeping mode.

In operation 602, the AR system suspends one or more components of the audio input pipeline 468 placing the one or more components in a sleeping or low-power mode while the microphone component 460 is placed in a limited operational mode. In some examples, the audio service component 462 is suspended. In some examples, the limited operational mode includes setting the microphone component 460 to capture audio input data 464 at a limited sampling frequency that is a reduced sampling frequency less than a fully operational sampling frequency. In some examples, a limited sampling frequency of a limited operational mode is 5,000 Hertz. In some examples, a fully operational sampling frequency is 50,000 Hertz.

In some examples, the AR system places the audio input pipeline 468 in a suspended mode by generating a suspend command 620 and communicating the suspend command 620 to one or more components of the audio input pipeline 468. In some examples, the AR system places the microphone component 460 in a limited operational mode by generating a limited operational mode command 628 and communicating the limited operational mode command 628 to the microphone component 460.

The microphone component 460 receives the limited operational mode command 628 and begins operating in a limited operational mode. In the limited operational mode, the camera microphone component 460 captures audio data at a limited sampling frequency while the rest of the components of the audio input pipeline 468 are in a suspended mode. The audio data of an audio wake command 624 being made by a user 616 as a wake command. In some examples, the audio wake command 624 is a voice command made by the user such as a specific word such as "Snap". In some examples, the audio wake command 624 is a sound deliberately made by the user using their hands or other appendages that is intended as an audio command, such as the user clapping their hands or snapping their fingers.

While in the limited operational mode, the microphone component 460 recognizes audio commands that are possible audio wake commands in the audio data using artificial intelligence methodologies and an audio wake command classifier 470 trained using machine learning methodologies. In some examples, the audio wake command classifier 470 recognizes conservative approximations of audio commands made by a user with high recall, but low precision. The microphone component 460 generates possible audio wake command data 622 based on the possible audio wake commands recognized by the audio wake command classifier 470.

In operation 604, the AR system reads the possible audio wake command data 622 generated by the microphone component 460. In operation 606, the AR system detects whether or not the user 616 is making a possible audio wake command based on the possible audio wake command data 622. In operation 606, based on detecting that the user 616 is not making a possible audio wake command, the AR system resumes operation 604 and continues to read the possible audio wake command data 622.

In operation 608, based on detecting that the user 616 is making a possible audio wake command, the AR system wakes the components of the audio input pipeline 468. In some examples, the AR system generates a wake command 626 and communicates the wake command 626 to the audio input pipeline 468. In operation 608, the AR system commands the microphone component 460 to enter a fully operational mode. In some examples, the AR system generates a fully operational mode command 630 and communicates the fully operational mode command 630 to the microphone component 460. In the fully operational mode, an audio sensor of the microphone component 460 captures audio data at a fully operational sampling frequency that is higher than a limited sampling frequency. In some examples, the AR system generates a fully operational mode command 630 and communicates the fully operational mode command 630 to the microphone component 460.

The audio input pipeline 468 receives the wake command 626 and wakes one or more sleeping components of the audio input pipeline 468. In some examples, the audio service component 462 is awakened and begins operating in a fully powered mode. The microphone component 460 receives the fully operational mode command 630 and begins capturing audio data at a fully operational sampling frequency. The audio input pipeline 468 processes the audio input data 464 generated by the camera component 402 at the fully operational sampling frequency to generate audio data 466 for the AR system to use to determine if the audio wake command 624 being made by the user 616 that was recognized as a possible audio wake command is actually an audio wake command. The audio input pipeline 468 generates audio data 466 based on the audio input data 464 generated by the microphone component 460. The audio service component 462 of the audio input pipeline 468 communicates the audio data 466 to the AR system.

In operation 610, the AR system reads the audio data 466 from the audio input pipeline 468. In operation 612, the AR system verifies whether or not the user 616 is actually making an audio wake command based on the audio data 466. That is the AR system verifies that the possible audio wake command detected in operation 506 based on the possible audio wake command data 622 generated by the microphone component 460 in a limited operational mode using the audio wake command classifier 470 is an actual audio wake command based on the audio data 466 generated by the audio input pipeline 468 in a fully operational mode.

In operation 614, on the basis of verifying that the user 616 is actually making the audio wake command, the AR system wakes components of the AR system and initiates an interactive AR application, such as AR interactive application component 420, that is presented to the user of the AR system. In some examples, the AR system operates in a suspended mode by lowering a clock frequency of one or more processors, such as processors 302. When the AR system enters a fully operational mode, the AR system increases the clock frequency of the one or more processors. In some examples, the AR system operates in a suspended mode by depowering certain components, such as output components 328, biometric components 334, motion components 336, environmental components 338, and position components 340. When the AR system enters a fully operational mode, the AR system powers the depowered components.

On the basis of failing to verify that the user 616 is making the audio wake command, the AR system transitions to operation 602. In operation 602, the AR system suspends the audio input pipeline 468 and places the microphone component 460 in a limited operational mode and continues executing the audio wake and suspend process 618 in a low-power mode as described herein.

In some examples, the AR system detects the possible audio wake command and wakes the components of the audio input pipeline 468 from the suspended mode and the microphone component 460 from the limited operational mode while the user is still making the audio wake command 624. This allows the AR system to use the audio input pipeline 468 to verify that a possible audio wake command detected by the AR system is actually an audio wake command while the user is still making the audio wake command 624. That is, the awakened fully operational audio input pipeline 468 recognizes the same audio wake command 624 being made by the user 616 that was identified as a possible audio wake command by the audio wake command classifier 470 of the microphone component 460 while the audio input pipeline 468 was in the suspended mode. In some examples, a latency of transitioning from the suspended mode to the fully operational mode by the audio input pipeline 468 and transitioning from the limited operational mode to the fully operational mode by the microphone component 460 is about 100 milliseconds.

In some examples a user makes an audio wake command by snapping the fingers of one or both of the user's hands.

In some examples, the audio wake command classifier 470 is a component of the audio input pipeline 468.

In some examples, the audio wake and suspend process 618 performs the operations of the audio input pipeline 468.

Figure 7:
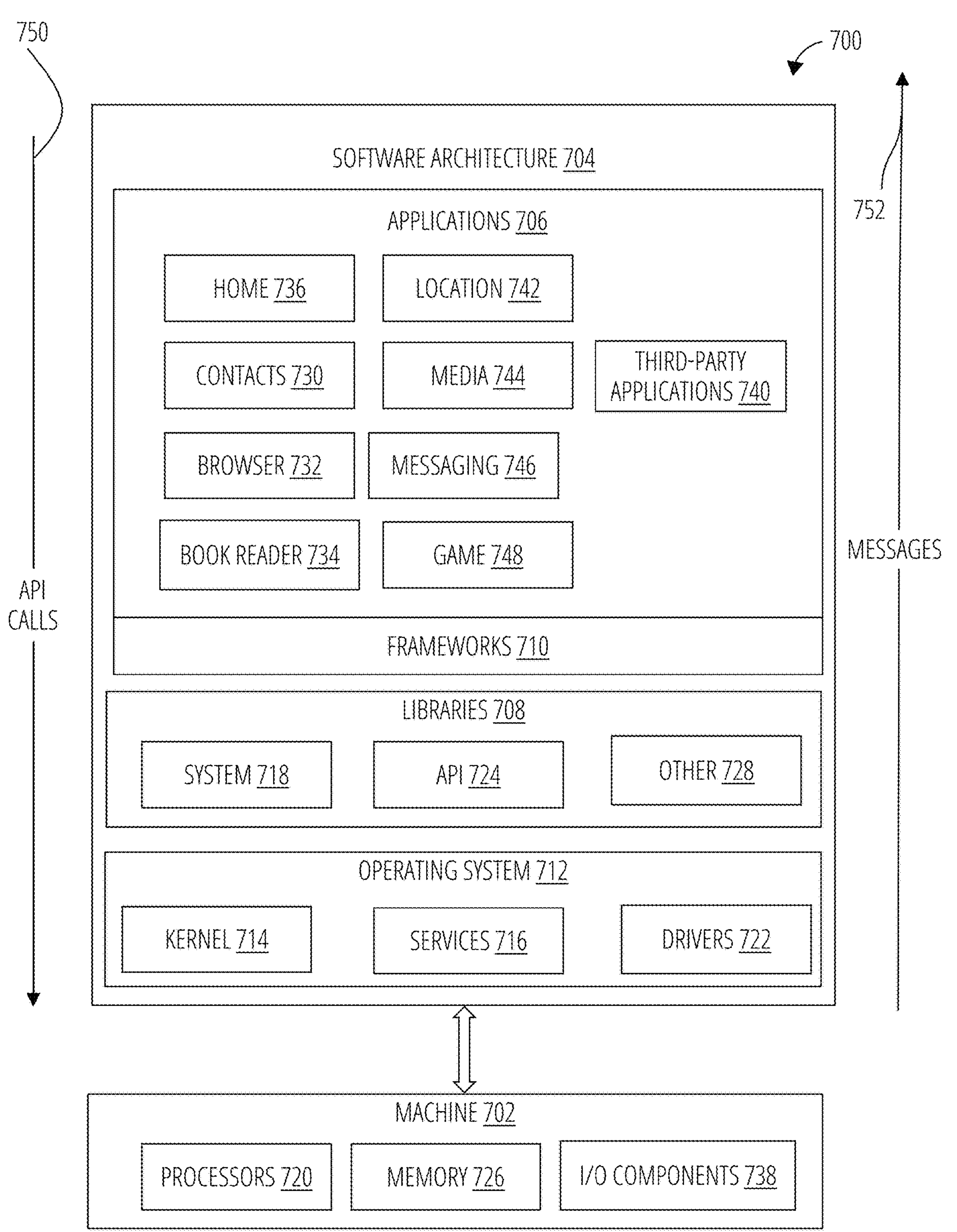
FIG. 7 is a block diagram showing a software architecture within which the present disclosure may be implemented, in accordance with some examples.

FIG. 7 is a block diagram 700 illustrating a software architecture 704, which can be installed on any one or more of the devices described herein. The software architecture 704 is supported by hardware such as a machine 702 that includes processors 720, memory 726, and I/O components 738. In this example, the software architecture 704 can be conceptualized as a stack of layers, where individual layers provide a particular functionality. The software architecture 704 includes layers such as an operating system 712, libraries 708, frameworks 710, and applications 706. Operationally, the applications 706 invoke API calls 750 through the software stack and receive messages 752 in response to the API calls 750.

The operating system 712 manages hardware resources and provides common services. The operating system 712 includes, for example, a kernel 714, services 716, and drivers 722. The kernel 714 acts as an abstraction layer between the hardware and the other software layers. For example, the kernel 714 provides memory management, processor management (e.g., scheduling), component management, networking, and security settings, among other functionalities. The services 716 can provide other common services for the other software layers. The drivers 722 are responsible for controlling or interfacing with the underlying hardware. For instance, the drivers 722 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 708 provide a low-level common infrastructure used by the applications 706. The libraries 708 can include system libraries 718 (e.g., C standard library) that provide functions such as memory allocation functions, string manipulation functions, mathematic functions, and the like. In addition, the libraries 708 can include API libraries 724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) graphic content on a display, GLMotif used to implement user interfaces), image feature extraction libraries (e.g. OpenIMAJ), database libraries (e.g., SQLite to provide various relational database functions), web libraries (e.g., WebKit to provide web browsing functionality), and the like. The libraries 708 can also include a wide variety of other libraries 728 to provide many other APIs to the applications 706.

The frameworks 710 provide a high-level common infrastructure that is used by the applications 706. For example, the frameworks 710 provide various graphical user interface (GUI) functions, high-level resource management, and high-level location services. The frameworks 710 can provide a broad spectrum of other APIs that can be used by the applications 706, some of which may be specific to a particular operating system or platform.

In some examples, the applications 706 may include a home application 736, a contacts application 730, a browser application 732, a book reader application 734, a location application 742, a media application 744, a messaging application 746, a game application 748, and a broad assortment of other applications such as third-party applications 740. The applications 706 are programs that execute functions defined in the programs. Various programming languages can be employed to create one or more of the applications 706, structured in a variety of manners, such as object-oriented programming languages (e.g., Objective-C, Java, or C++) or procedural programming languages (e.g., C or assembly language). In a specific example, the third-party applications 740 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 740 can invoke the API calls 750 provided by the operating system 712 to facilitate functionality described herein.

Figure 8:
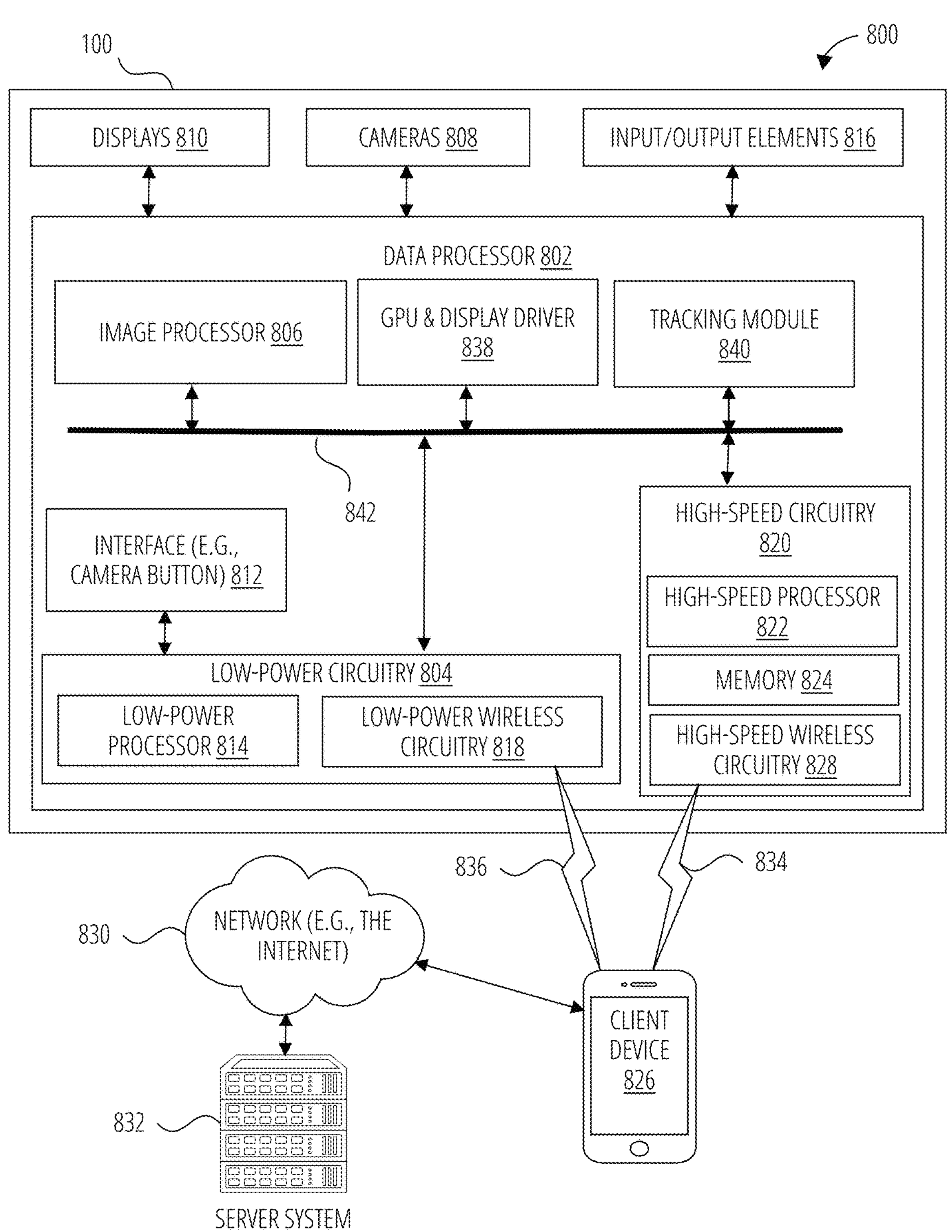
FIG. 8 is a block diagram illustrating a networked system including details of a head-worn AR system, in accordance with some examples.

FIG. 8 is a block diagram illustrating a networked system 800 including details of the glasses 100, in accordance with some examples. The networked system 800 includes the glasses 100, a client device 826, and a server system 832. The client device 826 may be a smartphone, tablet, phablet, laptop computer, access point, or any other such device capable of connecting with the glasses 100 using a low-power wireless connection 836 and/or a high-speed wireless connection 834. The client device 826 is connected to the server system 832 via the network 830. The network 830 may include any combination of wired and wireless connections. The server system 832 may be one or more computing devices as part of a service or network computing system. The client device 826 and any elements of the server system 832 and network 830 may be implemented using details of the software architecture 704 or the machine 300 described in FIG. 7 and FIG. 3 respectively.

The glasses 100 include a data processor 802, displays 810, one or more cameras 808, and additional input/output elements 816. The input/output elements 816 may include microphones, audio speakers, biometric sensors, additional sensors, or additional display elements integrated with the data processor 802. Examples of the input/output elements 816 are discussed further with respect to FIG. 7 and FIG. 3. For example, the input/output elements 816 may include any of I/O components 306 including output components 328, motion components 336, and so forth. Examples of the displays 810 are discussed in FIG. 2. In the particular examples described herein, the displays 810 include a display for the user's left and right eyes.

The data processor 802 includes an image processor 806 (e.g., a video processor), a GPU & display driver 838, a tracking module 840, an interface 812, low-power circuitry 804, and high-speed circuitry 820. The components of the data processor 802 are interconnected by a bus 842.

The interface 812 refers to any source of a user command that is provided to the data processor 802. In one or more examples, the interface 812 is a physical button that, when depressed, sends a user input signal from the interface 812 to a low-power processor 814. A depression of such button followed by an immediate release may be processed by the low-power processor 814 as a request to capture a single image, or vice versa. A depression of such a button for a first period of time may be processed by the low-power processor 814 as a request to capture video data while the button is depressed, and to cease video capture when the button is released, with the video captured while the button was depressed stored as a single video file. Alternatively, depression of a button for an extended period of time may capture a still image. In some examples, the interface 812 may be any mechanical switch or physical interface capable of accepting user inputs associated with a request for data from the cameras 808. In other examples, the interface 812 may have a software component, or may be associated with a command received wirelessly from another source, such as from the client device 826.

The image processor 806 includes circuitry to receive signals from the cameras 808 and process those signals from the cameras 808 into a format suitable for storage in the memory 824 or for transmission to the client device 826. In one or more examples, the image processor 806 (e.g., video processor) comprises a microprocessor integrated circuit (IC) customized for processing sensor data from the cameras 808, along with volatile memory used by the microprocessor in operation.

The low-power circuitry 804 includes the low-power processor 814 and the low-power wireless circuitry 818. These elements of the low-power circuitry 804 may be implemented as separate elements or may be implemented on a single IC as part of a system on a single chip. The low-power processor 814 includes logic for managing the other elements of the glasses 100. As described above, for example, the low-power processor 814 may accept user input signals from the interface 812. The low-power processor 814 may also be configured to receive input signals or instruction communications from the client device 826 via the low-power wireless connection 836. The low-power wireless circuitry 818 includes circuit elements for implementing a low-power wireless communication system. Bluetooth™ Smart, also known as Bluetooth™ low energy, is one standard implementation of a low power wireless communication system that may be used to implement the low-power wireless circuitry 818. In other examples, other low power communication systems may be used.

The high-speed circuitry 820 includes a high-speed processor 822, a memory 824, and a high-speed wireless circuitry 828. The high-speed processor 822 may be any processor capable of managing high-speed communications and operation of any general computing system used for the data processor 802. The high-speed processor 822 includes processing resources used for managing high-speed data transfers on the high-speed wireless connection 834 using the high-speed wireless circuitry 828. In some examples, the high-speed processor 822 executes an operating system such as a LINUX operating system or other such operating system such as the operating system 712 of FIG. 7. In addition to any other responsibilities, the high-speed processor 822 executing a software architecture for the data processor 802 is used to manage data transfers with the high-speed wireless circuitry 828. In some examples, the high-speed wireless circuitry 828 is configured to implement Institute of Electrical and Electronic Engineers (IEEE) 802.11 communication standards, also referred to herein as Wi-Fi. In other examples, other high-speed communications standards may be implemented by the high-speed wireless circuitry 828.

The memory 824 includes any storage device capable of storing camera data generated by the cameras 808 and the image processor 806. While the memory 824 is shown as integrated with the high-speed circuitry 820, in other examples, the memory 824 may be an independent standalone element of the data processor 802. In some such examples, electrical routing lines may provide a connection through a chip that includes the high-speed processor 822 from image processor 806 or the low-power processor 814 to the memory 824. In other examples, the high-speed processor 822 may manage addressing of the memory 824 such that the low-power processor 814 will boot the high-speed processor 822 any time that a read or write operation involving the memory 824 is desired.

The tracking module 840 estimates a pose of the glasses 100. For example, the tracking module 840 uses image data and associated inertial data from the cameras 808 and the position components 340, as well as GPS data, to track a location and determine a pose of the glasses 100 relative to a frame of reference (e.g., real-world scene). The tracking module 840 continually gathers and uses updated sensor data describing movements of the glasses 100 to determine updated three-dimensional poses of the glasses 100 that indicate changes in the relative position and orientation relative to physical objects in the real-world scene. The tracking module 840 permits visual placement of virtual objects relative to physical objects by the glasses 100 within the field of view of the user via the displays 810.

The GPU & display driver 838 may use the pose of the glasses 100 to generate frames of virtual content or other content to be presented on the displays 810 when the glasses 100 are functioning in a traditional augmented reality mode. In this mode, the GPU & display driver 838 generates updated frames of virtual content based on updated three-dimensional poses of the glasses 100, which reflect changes in the position and orientation of the user in relation to physical objects in the user's real-world scene.

One or more functions or operations described herein may also be performed in an application resident on the glasses 100 or on the client device 826, or on a remote server. For example, one or more functions or operations described herein may be performed by one of the applications 706 such as messaging application 746.

Figure 9:
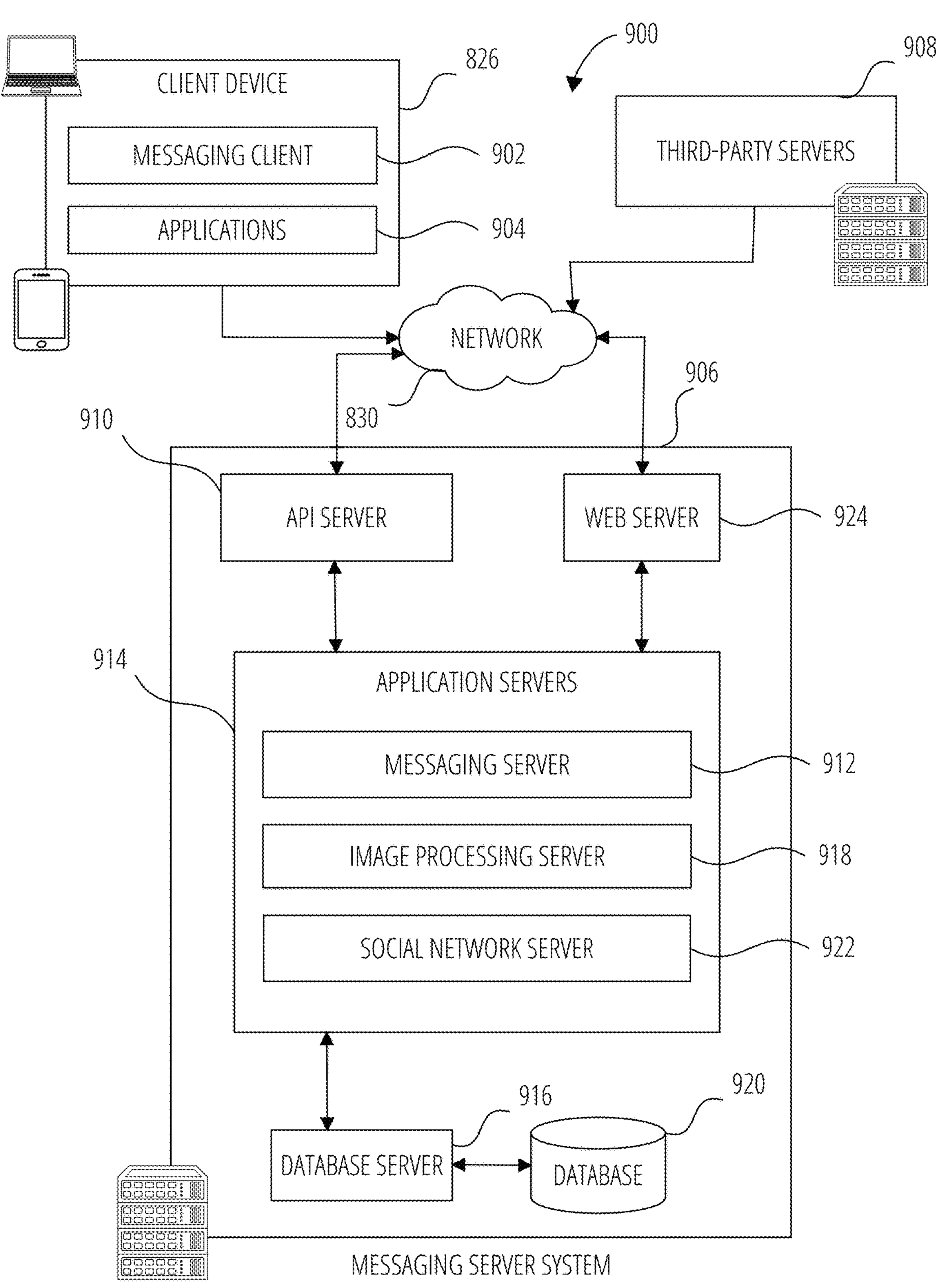
FIG. 9 is a block diagram showing an example messaging system for exchanging data (e.g., messages and associated content) over a network in accordance with some examples

FIG. 9 is a block diagram showing an example messaging system 900 for exchanging data (e.g., messages and associated content) over a network. The messaging system 900 includes multiple instances of a client device 826 which host a number of applications, including a messaging client 902 and other applications 904. A messaging client 902 is communicatively coupled to other instances of the messaging client 902 (e.g., hosted on respective other client devices 826), a messaging server system 906 and third-party servers 908 via a network 830 (e.g., the Internet). A messaging client 902 can also communicate with locally-hosted applications 904 using Application Program Interfaces (APIs).

A messaging client 902 is able to communicate and exchange data with other messaging clients 902 and with the messaging server system 906 via the network 830. The data exchanged between messaging clients 902, and between a messaging client 902 and the messaging server system 906, includes functions (e.g., commands to invoke functions) as well as payload data (e.g., text, audio, video or other multimedia data).

The messaging server system 906 provides server-side functionality via the network 830 to a particular messaging client 902. While some functions of the messaging system 900 are described herein as being performed by either a messaging client 902 or by the messaging server system 906, the location of some functionality either within the messaging client 902 or the messaging server system 906 may be a design choice. For example, it may be technically preferable to initially deploy some technology and functionality within the messaging server system 906 but to later migrate this technology and functionality to the messaging client 902 where a client device 826 has sufficient processing capacity.

The messaging server system 906 supports various services and operations that are provided to the messaging client 902. Such operations include transmitting data to, receiving data from, and processing data generated by the messaging client 902. This data may include message content, client device information, geolocation information, media augmentation and overlays, message content persistence conditions, social network information, and live event information, as examples. Data exchanges within the messaging system 900 are invoked and controlled through functions available via user interfaces (UIs) of the messaging client 902.

Turning now specifically to the messaging server system 906, an Application Program Interface (API) server 910 is coupled to, and provides a programmatic interface to, application servers 914. The application servers 914 are communicatively coupled to a database server 916, which facilitates access to a database 920 that stores data associated with messages processed by the application servers 914. Similarly, a web server 924 is coupled to the application servers 914, and provides web-based interfaces to the application servers 914. To this end, the web server 924 processes incoming network requests over the Hypertext Transfer Protocol (HTTP) and several other related protocols.

The Application Program Interface (API) server 910 receives and transmits message data (e.g., commands and message payloads) between the client device 826 and the application servers 914. Specifically, the Application Program Interface (API) server 910 provides a set of interfaces (e.g., routines and protocols) that can be called or queried by the messaging client 902 in order to invoke functionality of the application servers 914. The Application Program Interface (API) server 910 exposes various functions supported by the application servers 914, including account registration, login functionality, the sending of messages, via the application servers 914, from a particular messaging client 902 to another messaging client 902, the sending of media files (e.g., images or video) from a messaging client 902 to a messaging server 912, and for possible access by another messaging client 902, the settings of a collection of media data (e.g., story), the retrieval of a list of friends of a user of a client device 826, the retrieval of such collections, the retrieval of messages and content, the addition and deletion of entities (e.g., friends) to an entity graph (e.g., a social graph), the location of friends within a social graph, and opening an application event (e.g., relating to the messaging client 902).

The application servers 914 host a number of server applications and subsystems, including for example a messaging server 912, an image processing server 918, and a social network server 922. The messaging server 912 implements a number of message processing technologies and functions, particularly related to the aggregation and other processing of content (e.g., textual and multimedia content) included in messages received from multiple instances of the messaging client 902. As will be described in further detail, the text and media content from multiple sources may be aggregated into collections of content (e.g., called stories or galleries). These collections are then made available to the messaging client 902. Other processor and memory intensive processing of data may also be performed server-side by the messaging server 912, in view of the hardware requirements for such processing.

The application servers 914 also include an image processing server 918 that is dedicated to performing various image processing operations, typically with respect to images or video within the payload of a message sent from or received at the messaging server 912.

The social network server 922 supports various social networking functions and services and makes these functions and services available to the messaging server 912. To this end, the social network server 922 maintains and accesses an entity graph within the database 920. Examples of functions and services supported by the social network server 922 include the identification of other users of the messaging system 900 with which a particular user has relationships or is "following," and also the identification of other entities and interests of a particular user.

The messaging client 902 can notify a user of the client device 826, or other users related to such a user (e.g., "friends"), of activity taking place in shared or shareable sessions. For example, the messaging client 902 can provide participants in a conversation (e.g., a chat session) in the messaging client 902 with notifications relating to the current or recent use of a game by one or more members of a group of users. One or more users can be invited to join in an active session or to launch a new session. In some examples, shared sessions can provide a shared augmented reality experience in which multiple people can collaborate or participate.

A "carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

A "client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

A "communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

A "component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing some operations and may be configured or arranged in a particular physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform some operations as described herein. A hardware component may also be implemented mechanically, electronically, or any suitable combination thereof. For example, a hardware component may include dedicated circuitry or logic that is permanently configured to perform some operations. A hardware component may be a special-purpose processor, such as a field-programmable gate array (FPGA) or an application specific integrated circuit (ASIC). A hardware component may also include programmable logic or circuitry that is temporarily configured by software to perform some operations. For example, a hardware component may include software executed by a general-purpose processor or other programmable processor. Once configured by such software, hardware components become specific machines (or specific components of a machine) tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") is to be understood to encompass a tangible entity, be that an entity that is physically constructed, permanently configured (e.g., hardwired), or temporarily configured (e.g., programmed) to operate in a particular manner or to perform some operations described herein. Considering examples in which hardware components are temporarily configured (e.g., programmed), the hardware components may not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be partially processor-implemented, with a particular processor or processors being an example of hardware. For example, some of the operations of a method may be performed by one or more processors or processor-implemented components. Moreover, the one or more processors may also operate to support performance of the relevant operations in a "cloud computing" environment or as a "software as a service" (SaaS). For example, at some of the operations may be performed by a group of computers (as examples of machines including processors), with these operations being accessible via a network (e.g., the Internet) and via one or more appropriate interfaces (e.g., an API). The performance of some of the operations may be distributed among the processors, residing within a single machine as well as being deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

A "computer-readable medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

A "machine-storage medium" refers to a single or multiple storage devices and/or media (e.g., a centralized or distributed database, and/or associated caches and servers) that store executable instructions, routines and/or data. The term includes, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at some of which are covered under the term "signal medium."

A "processor" refers to any circuit or virtual circuit (a physical circuit emulated by logic executing on an actual processor) that manipulates data values according to control signals (e.g., "commands", "op codes", "machine code", and so forth) and which produces associated output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A "signal medium" refers to any intangible medium that is capable of storing, encoding, or carrying the instructions for execution by a machine and includes digital or analog communications signals or other intangible media to facilitate communication of software or data. The term "signal medium" may be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A computer-implemented method comprising:

detecting, by one or more processors using a microphone component of an Augmented Reality (AR) system, a possible audio wake command by a user while the AR system is in a low power state;

waking, by the one or more processors, the AR system from the low power state to a fully powered mode in response to detecting the possible audio wake command;

verifying, by the one or more processors using a machine learning model, the possible audio wake command is an audio wake command; and initiating, by the one or more processors, an interactive AR application in response to verifying the possible audio wake command is the audio wake command.

2. The computer-implemented method of claim 1, wherein the low power state comprises a suspended mode in which the one or more processors operate at a specified clock frequency.

3. The computer-implemented method of claim 1, wherein detecting the possible audio wake command further comprises:

recognizing the possible audio wake command using a neural network of the microphone component.

4. The computer-implemented method of claim 1, wherein the low power state comprises:

one or more components of the AR system being in a suspended mode; and a camera component being in a limited operational mode.

5. The method of claim 4, wherein the limited operational mode of the camera component includes a limited frame rate.

6. The method of claim 1, further comprising:

performing, by the one or more processors, based on failing to verify the possible audio wake command, operations comprising:

placing one or more components of the AR system in a suspended mode; and placing a camera component in a limited operational mode.

7. The method of claim 1, wherein the AR system comprises a head-worn device.

8. A machine comprising:

at least one processor; and at least one memory storing instructions that, when executed by the at least one processor, cause the machine to perform operations comprising:

detecting, by one or more processors using a microphone component of an Augmented Reality (AR) system, a possible audio wake command by a user while the AR system is in a low power state;

waking, by the one or more processors, the AR system from the low power state to a fully powered mode in response to detecting the possible audio wake command;

verifying, by the one or more processors using a machine learning model, the possible audio wake command is an audio wake command; and initiating, by the one or more processors, an interactive AR application in response to verifying the possible audio wake command is the audio wake command.

9. The machine of claim 8, wherein the low power state comprises a suspended mode in which the one or more processors operate at a specified clock frequency.

10. The machine of claim 8, wherein detecting the possible audio wake command further comprises:

recognizing the possible audio wake command using a neural network of the microphone component.

11. The machine of claim 8, wherein the low power state comprises:

one or more components of the AR system being in a suspended mode; and a camera component being in a limited operational mode.

12. The machine of claim 11, wherein the limited operational mode of the camera component includes a limited frame rate.

13. The machine of claim 8, wherein the operations further comprise:

performing, by the one or more processors, based on failing to verify the possible audio wake command, operations comprising:

placing one or more components of the AR system in a suspended mode; and placing a camera component in a limited operational mode.

14. The machine of claim 8, wherein the AR system comprises a head-worn device.

15. A machine-storage medium including instructions that, when executed by a machine, cause the machine to perform operations comprising:

detecting, by one or more processors using a microphone component of an Augmented Reality (AR) system, a possible audio wake command by a user while the AR system is in a low power state;

waking, by the one or more processors, the AR system from the low power state to a fully powered mode in response to detecting the possible audio wake command;

verifying, by the one or more processors using a machine learning model, the possible audio wake command is an audio wake command; and initiating, by the one or more processors, an interactive AR application in response to verifying the possible audio wake command is the audio wake command.

16. The machine-storage medium of claim 15, wherein the low power state comprises a suspended mode in which the one or more processors operate at a specified clock frequency.

17. The machine-storage medium of claim 15, wherein detecting the possible audio wake command further comprises:

recognizing the possible audio wake command using a neural network of the microphone component.

18. The machine-storage medium of claim 15, wherein the low power state comprises:

one or more components of the AR system being in a suspended mode; and a camera component being in a limited operational mode.

19. The machine-storage medium of claim 18, wherein the limited operational mode of the camera component includes a limited frame rate.

20. The machine-storage medium of claim 15, wherein the AR system comprises a head-worn device.

* * * * *